(12) United States Patent
Aiba et al.

(10) Patent No.: US 8,599,672 B2
(45) Date of Patent: Dec. 3, 2013

(54) OBJECTIVE LENS, OPTICAL PICKUP DEVICE, AND OPTICAL DISC DEVICE

(75) Inventors: Motoo Aiba, Tokyo (JP); Hiroyuki Sakakibara, Tokyo (JP); Taiji Minakawa, Tokyo (JP); Fumihiko Hanzawa, Tokyo (JP); Masashi Abe, Tokyo (JP); Jun Adachi, Tokyo (JP); Katsutoshi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/601,589

(22) Filed: Aug. 31, 2012

(65) Prior Publication Data
US 2013/0094339 A1   Apr. 18, 2013

(30) Foreign Application Priority Data
Sep. 7, 2011 (JP) .................................. 2011-194712

(51) Int. Cl.
    *G11B 7/00* (2006.01)
(52) U.S. Cl.
    USPC ............ 369/112.23; 369/112.03; 369/112.06; 369/112.25
(58) Field of Classification Search
    USPC ............. 369/112.23, 112.01, 112.03, 112.06, 369/112.05, 112.11, 112.12, 112.13, 112.25
    See application file for complete search history.

(56) References Cited

U.S. PATENT DOCUMENTS

| | | | |
|---|---|---|---|
| 5,815,293 A * | 9/1998 | Komma et al. | 359/19 |
| 7,227,704 B2 * | 6/2007 | Koike | 359/719 |
| 7,239,598 B2 * | 7/2007 | Maruyama et al. | 369/112.23 |
| 2003/0095492 A1 * | 5/2003 | Nishino et al. | 369/112.08 |
| 2005/0122880 A1 * | 6/2005 | Tatsuno et al. | 369/99 |
| 2005/0180294 A1 * | 8/2005 | Kimura et al. | 369/112.05 |
| 2006/0132920 A1 * | 6/2006 | Kleemann | 359/565 |
| 2009/0034398 A1 * | 2/2009 | Kaneda et al. | 369/112.03 |
| 2010/0322060 A1 * | 12/2010 | Yasui | 369/112.03 |

FOREIGN PATENT DOCUMENTS

JP  2010-055693 A  3/2010

* cited by examiner

*Primary Examiner* — Thomas Alunkal
(74) *Attorney, Agent, or Firm* — Wolf, Greenfield & Sacks, P.C.

(57) ABSTRACT

Provided is an objective lens including a diffraction portion provided on a laser beam incident plane or output plane. The diffraction portion includes first second, and third diffraction regions, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc. An evaluation parameter calculated on the basis of an in-plane efficiency distribution function has a value corresponding to a symbol error rate that is less than a predetermined value.

15 Claims, 12 Drawing Sheets

OBJECTIVE LENS, OPTICAL PICKUP DEVICE, AND OPTICAL DISC DEVICE

BACKGROUND

The present disclosure relates to an objective lens, an optical pickup device, and an optical disc device.

JP 2010-55693A discloses an objective lens, an optical pickup device, and an optical disc device that can condense, on data recording portions of a plurality of types of optical discs (i.e., BD, DVD, and CD), laser beams with respective wavelengths according to the plurality of types of optical discs.

SUMMARY

However, there has been unknown a quantitative guideline for reducing the symbol error rate in designing the aforementioned objective lens that is compatible with a plurality of types of optical discs. Thus, such a guideline is desired.

According to an embodiment of the present disclosure, there is provided an objective lens including a diffraction portion provided on a laser beam incident plane or a laser beam output plane of the objective lens. The diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc. An evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

According to another embodiment of the present disclosure, there is provided an evaluation parameter having a correlation with the symbol error rate.

According to still another embodiment of the present disclosure, there is provided an optical pick device and an optical disc device each having the aforementioned objective lens, and a method of designing the objective lens.

According to the embodiments of the present disclosure described above, an evaluation parameter that has a correlation with the symbol error rate is provided. Such an evaluation parameter serves as a quantitative guideline for reducing the symbol error rate. Thus, according to the present disclosure, such a guideline is provided.

DETAILED DESCRIPTION OF THE EMBODIMENTS

Figure 1:
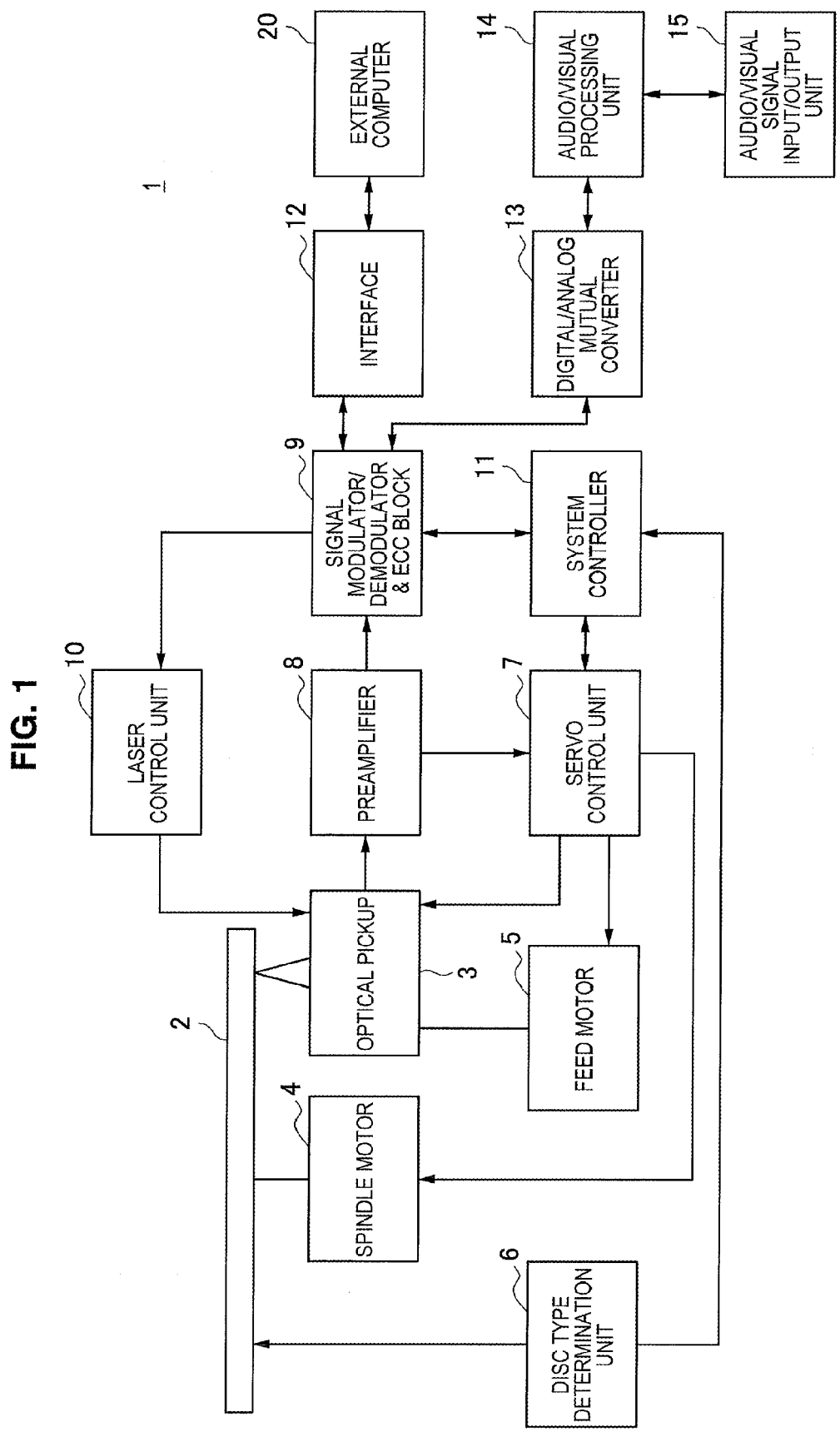
FIG. 1 is a block diagram showing an optical disc device in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Study regarding the Related Art
2. Configuration of Optical Disc Device
3. Configuration of Optical Pickup Device
4. Structure of Objective Lens
 4-1. Summary of Structure
 4-2. Example of Objective Lens
 4-3. In-plane Efficiency Distribution Function
 4-4. Evaluation Parameter x
 4-5. Evaluation Parameter y
 4-6. Evaluation Parameter z <1. Study Regarding the Related Art>

The inventors have conducted concentrated studies about the related art of the present disclosure, and developed an objective lens, an optical pickup device, and an optical disc device in accordance with the present disclosure. Thus, the studies conducted by the inventors will be described first.

So far, there have been proposed techniques for condensing laser beams according to a plurality of types of optical discs on data recording portions of a plurality of types of optical discs (i.e., Blu-ray Disc (BD), DVD, and CD), respectively.

For example, there is known an optical pickup device having a wavefront conversion element that is arranged at a position ahead of an objective lens. The wavefront conversion element causes a diffracted light beam whose order differs according the wavelength of a laser beam to be incident on the objective lens. Accordingly, a laser beam according to the type of an optical disc is condensed on a data recording portion of the optical disc. That is, a laser beam for BD (a laser beam with a wavelength of 405 nm) is condensed on a data recording portion of a BD. A laser beam for DVD (a laser beam with a wavelength of 660 nm) is condensed on a data recording portion of a DVD. A laser beam for CD (a laser beam with a wavelength of 785 nm) is condensed on a data recording portion of a CD.

In addition, an optical pickup device having an objective lens that is compatible with a plurality of wavelengths is known. A laser beam incident plane of an objective lens that is compatible with a plurality of wavelengths includes an inner annular zone that is substantially circular in shape and is provided on the innermost circumference, a middle annular zone that is annular in shape and is provided outside the inner annular zone, and an outer annular zone that is annular in shape and is provided outside the middle annular zone. Typically, a diffraction portion is formed on each annular zone. However, diffraction portions may be formed only on the inner annular zone and the middle annular zone.

The inner annular zone contributes to the recording and playback for a BD, DVD, and CD. That is, the inner annular zone condenses laser beams for BD, laser beams for DVD, and laser beams for CD on data recording portions of a BD, DVD, and CD, respectively.

Meanwhile, the middle annular zone contributes to the recording and playback for a BD and DVD. That is, the middle annular zone condenses laser beams for BD and laser beams for DVD on data recording portions of a BD and DVD, respectively.

Meanwhile, the outer annular zone contributes to the recording and playback for a BD. That is, the outer annular zone condenses laser beams for BD on a data recording portion of a BD.

According to such a structure, laser beams for CD are, when having passed through the inner annular zone, condensed on a data recording portion of a CD. Meanwhile, laser beams for CD are, when having passed through the other annular zones, flared at the data recording portion. That is, laser beams for CD are, when having passed through the other annular zones, condensed on portions other than the data recording portion. Laser beams for DVD are, when having passed through the inner annular zone or the middle annular zone, condensed on a data recording portion of a DVD. Meanwhile, laser beams for DVD are, when having passed through the outer annular zone, flared at the data recording portion. By contrast, laser beams for BD are, no matter which annular zone the laser beams have passed through, condensed on a data recording portion of a BD.

However, there has been unknown a quantitative guideline for reducing the symbol error rate in designing an objective lens that is compatible with a plurality of wavelengths as described above. Therefore, such objective lens has been designed through trial and error, but there remain large variations in the symbol error rate for BD (SER for BD), in particular.

It has been known that as an objective lens that is compatible with a plurality of wavelengths is provided with diffraction portions, the in-plane efficiency distribution is not constant unlike a dedicated objective lens for a single wavelength. However, as the relationship between the in-plane efficiency distribution and the symbol error rate is not known, the in-plane efficiency distribution has not been taken into consideration at all for designing an objective lens, or objective lenses have been designed so that the overall in-plane efficiency becomes high to the greatest degree possible. In contrast, the inventors have arrived at, by focusing on an in-plane efficiency distribution function of an objective lens, determining an evaluation parameter as a quantitative guideline for reducing the symbol error rate. Accordingly, it has been clarified that designing an objective lens so that the overall in-plane efficiency becomes high is not necessarily the best way in terms of improving the SER for BD. The term "in-plane efficiency distribution function" herein indicates the proportion of, among laser beams incident on an incident plane (lens plane) of an objective lens, laser beams that are condensed on a data recording portion, that is, the transmission efficiency of each region of the incident plane. Hereinafter, an objective lens and the like in accordance with the present disclosure will be described in detail.

<2. Configuration of Optical Disc Device>

Next, the configuration of the optical disc device 1 in accordance with this embodiment will be described with reference to FIG. 1. The optical disc device 1 includes an optical pickup device 3, a spindle motor 4, a feed motor 5, a disc type determination unit 6, a servo control unit 7, a preamplifier 8, a signal modulator/demodulator and an error-correcting code block (ECC block) 9, a laser control unit 10, a system controller 11, an interface 12, a digital-analog mutual converter 13, an audio/visual processing unit 14, and an audio/visual signal input/output unit 15.

An optical disc 2 can be inserted into and removed from the optical disc device 1. The optical disc 2 is any one of a BD, DVD, and CD. The optical disc device 1 reads information from the optical disc 2 using the optical pickup device 3, and performs various processes on the basis of the read information. In addition, the optical disc device 1 writes various types of information to the optical disc 2 using the optical pickup device 3.

The optical pickup device 3, by condensing laser beams according to the type of the optical disc 2 on a data recording portion of the optical disc 2, reads various types of information from the data recording portion of the optical disc 2. In addition, the optical pickup device 3 can also write various types of information to the data recording portion of the optical disc 2. Note that the data recording portion of the optical disc 2 is a plane on which various types of information are recorded as pits or recording marks, for example. A protective layer (cover glass) is formed on the data recording portion. The thickness of the cover glass is 0.1 (mm) in the case of a BD, 0.6 (mm) in the case of a DVD, and 1.2 (mm) in the case of a CD.

The spindle motor 4 rotates the optical disc 2. The feed motor 5 moves the optical pickup device 3. The disc type determination unit 6 determines the type of the optical disc 2, and outputs information about the result to the system controller 11. The servo control unit 7 controls the optical pickup device 3, the spindle motor 4, and the feed motor 5 on the basis of the information provided from the system controller 11 and the like. The preamplifier 8 amplifies the information provided from the optical pickup device 3, and outputs the information to the servo control unit 7 and the signal modulator/demodulator and the ECC block 9.

The signal modulator/demodulator and the ECC block 9 perform a modulation process, a demodulation process, and an error correction process according to the type of the optical disc 2. The signal modulator/demodulator and the ECC block 9 output information obtained through such processes to the laser control unit 10, the system controller 11, the interface 12, and the digital/analog mutual converter 13.

Specifically, the signal modulator/demodulator and the ECC block 9 perform a demodulation process and an error correction process according to the type of the optical disc 2 on the information provided from the preamplifier 8. That is, the signal modulator/demodulator and the ECC block 9, when information is read from the optical disc 2, perform a demodulation process and an error correction process. The signal modulator/demodulator and the ECC block 9 output information obtained through the demodulation process and the error correction process to the system controller 11, the interface 12, and the digital-analog mutual converter 13.

Meanwhile, the signal modulator/demodulator and the ECC block 9 perform a modulation process and an error correction process on the information provided from the interface 12 and the digital-analog mutual converter 13. That is, the signal modulator/demodulator and the ECC block 9, when information is to be written to the optical disc 2, perform a modulation process and an error correction process. The signal modulator/demodulator and the ECC block 9 output information obtained through a modulation process and an error correction process to the laser control unit 10 and the system controller 11.

The laser control unit 10 controls the optical pickup device 3 on the basis of the information provided from the signal modulator/demodulator and the ECC block 9. The system controller 11 controls each component of the optical disc device 1. The interface 12 can be connected to an external computer 20, and outputs information provided from the external computer 20, that is, information to be written to the optical disc 2 to the signal modulator/demodulator and the ECC block 9. In addition, the interface 12 outputs information provided from the signal modulator/demodulator and the ECC block 9, that is, information read from the optical disc 2 to the external computer 20.

The digital-analog mutual converter 13 performs analog conversion on the information provided from the signal modulator/demodulator and the ECC block 9, that is, information read from the optical disc 2, and outputs the information to the audio/visual processing unit 14. The digital-analog mutual converter 13 performs digital conversion on the information provided from the audio/visual processing unit 14, that is, information to be written to the optical disc 2, and outputs the information to the signal modulator/demodulator and the ECC block 9.

The audio/visual processing unit 14 performs various types of audio/visual processing on the information provided from the digital/analog converter 13, and outputs the thus obtained information to the audio/visual signal input/output unit 15. Meanwhile, the audio/visual processing unit 14 performs various types of audio/visual processing on the information provided from the audio/visual signal input/output unit 15, and outputs the thus obtained information to the digital-analog mutual converter 13.

The audio/visual signal input/output unit 15 is connected to an audio device (e.g., a speaker) and a visual device (e.g., a display) that are not shown, and exchanges information with such devices. Note that it is acceptable as long as the optical disc device 1 incorporates the optical pickup device 3, and thus the optical disc device 1 is not limited to the aforementioned configuration.

<3. Configuration of Optical Pickup Device>

Figure 2:
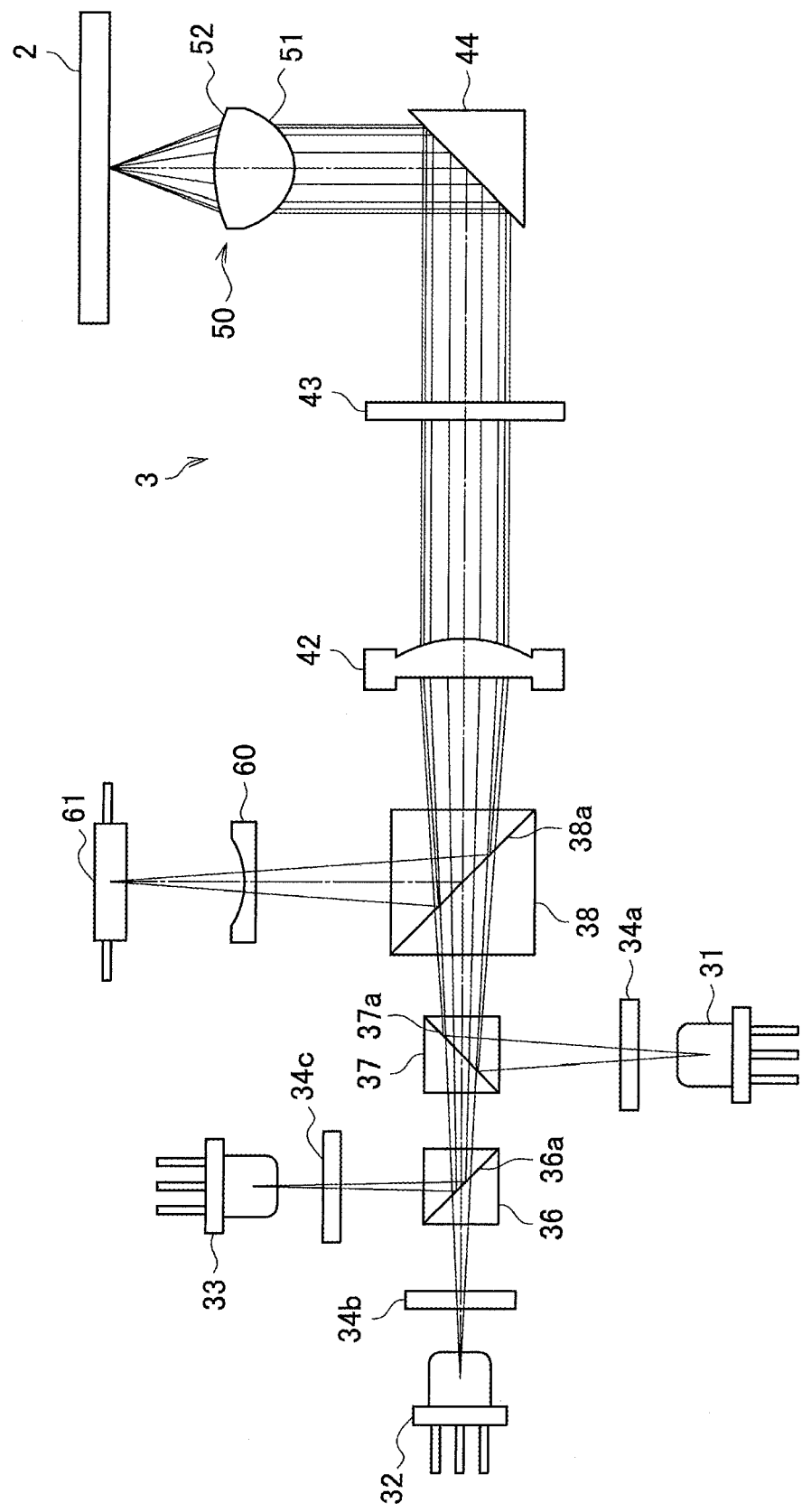
FIG. 2 is an explanatory diagram showing an optical pickup device in accordance with the embodiment.

Next, the configuration of the optical pickup device 3 will be described with reference to FIG. 2. The optical pickup device 3 includes first to third light source units 31 to 33, first to third diffraction gratings 34a to 34c, first to third beam splitters 36 to 38, a collimator lens 42, a ¼ wave plate, a rising mirror 44, an objective lens 50, a multi-lens 60, and a photodetector unit 61.

The first light source unit 31 emits a laser beam for BD, that is, a laser beam with a wavelength of 405 nm. The second light source unit 32 emits a laser beam for DVD, that is, a laser beam with a wavelength of 660 nm. The third light source unit 33 emits a laser beam for CD, that is, a laser beam with a wavelength of 785 nm The first diffraction grating 34a splits a laser beam emitted from the first light source unit 31 into a 0th order laser beam and a ±1th order laser beam. The split laser beams are caused to be incident on the second beam splitter 37. Note that the split laser beams are used for reading information recorded on the optical disc 2, for detecting tracking errors, and the like.

The second diffraction grating 34b splits a laser beam emitted from the second light source unit 32 into a 0th order laser beam and a ±1th order laser beam. The split laser beams are cased to be incident on the first beam splitter 36. Note that the split laser beams are used for reading information recorded on the optical disc 2, for detecting tracking errors, and the like.

The third diffraction grating 34c splits a laser beam emitted from the third light source unit 33 into a 0th order laser beam and a ±1th order laser beam. The split laser beams are caused to be incident on the first beam splitter 36. Note that the split laser beams are used for reading information recorded on the optical disc 2, for detecting tracking errors, and the like.

The first beam splitter 36 has a mirror surface 36a, and receives the laser beams emitted from the second and third light source units 32 and 33. The first beam splitter 36 outputs the received laser beams to the second beam splitter 37.

The second beam splitter 37 has a mirror surface 37a, and receives the laser beams output from the first beam splitter 36 and the laser beams emitted from the first light source unit 31. The second beam splitter 37 outputs the received laser beams to the third beam splitter 38. That is, the first and second beam splitters 36 and 37 receive the laser beams emitted from the first to third light source units 31 to 33, and outputs the received laser beams to the third beam splitter 38.

The third beam splitter 38 has a mirror surface 38a, and receives the laser beams output from the second beam splitter 37, that is, outbound laser beams to the collimator lens 42. In addition, the third beam splitter 38 outputs the laser beams output from the collimator lens 42, that is, inbound laser beams to the multi-lens 60.

The collimator lens 42 adjusts the laser beams output from the third beam splitter 38 so that the laser beams become parallel laser beams, and outputs the adjusted laser beams to the ¼ wave plate 43. The ¼ wave plate 43 provides a phase difference of a ¼ wavelength to the laser beams output from the collimator lens 42, thereby adjusting the laser beams so that they become circularly-polarized laser beams. The ¼ wave plate 43 outputs the adjusted laser beams to the rising mirror 44. The rising mirror 44 outputs the laser beams output from the ¼ wave plate 43 to the objective lens 50.

The objective lens 50 condenses the laser beams according to the type of the optical disc 2, output from the rising mirror 44, on the data recording portion of the optical disc 2. That is, the objective lens 50 condenses laser beams for BD on the data recording portion of the BD. Note that the aperture ratio and the focal length for BD of the objective lens 50 are 0.85 and 2.20 (mm), respectively, for example. In addition, the objective lens 50 condenses laser beams for DVD on the data recording portion of the DVD. Note that the aperture ratio and the focal length for DVD of the objective lens 50 are 0.60 and 2.36 (mm), respectively, for example. Further, the objective lens 50 condenses laser beams for CD on the data recording portion of the CD. Note that the aperture ratio and the focal length for CD of the objective lens 50 are 0.47 and 2.44 (mm), respectively, for example.

The laser beams condensed on the data recording portion of the optical disc 2 are reflected by the data recording portion of the optical disc 2. The reflected laser beams are caused to be incident on the photodetector unit 61 via the objective lens 50, the rising mirror 44, the ¼ wave plate 43, the collimator lens 42, the third beam splitter 38, and the multi-lens 60. The photodetector unit 61 reads information recorded on the data recording portion of the optical disc 2 on the basis of the incident laser beams. Accordingly, information recorded on the optical disc 2 is read. Meanwhile, laser beams condensed on the data recording portion of the optical disc 2 can also be written to the data recording portion. Accordingly, information is written to the optical disc 2.

The multi-lens 60 condenses the laser beams output from the third beam splitter 38 on the photodetector unit 61. The photodetector unit 61 reads information recorded on the optical disc 2 on the basis of the laser beams output from the multi-lens 60. The information read by the photodetector unit 61 is output to the preamplifier 8. In addition, the photodetector unit 61 detects various errors such as tracking errors. Information about the detection result is also output to the preamplifier 8. Note that it is acceptable as long as the optical pickup device 3 incorporates the objective lens 50, and the configuration of the optical pickup device 3 is not limited to the aforementioned configuration.

<4. Structure of Objective Lens>
[4-1. Summary of Structure]

Next, a summary of the structure of the objective lens 50 will be described with reference to FIGS. 3 to 5B. The objective lens 50 has an incident plane (S1 plane) 51 and an output plane (S1 plane) 52. Note that the position of a point on the incident plane 51 and the output plane 52 is represented by the polar coordinates (r,θ) having the optical axis L as the origin, for example. Symbol r represents the distance from a given point on the incident plane 51 and the output plane 52 to the optical axis L, that is, the radius. Symbol θ represents the angle between a line segment connecting the point on the incident plane 51 and the output plane 52 and the optical axis L and a predetermined reference axis (i.e., an axis perpendicular to the optical axis L).

Figure 3:
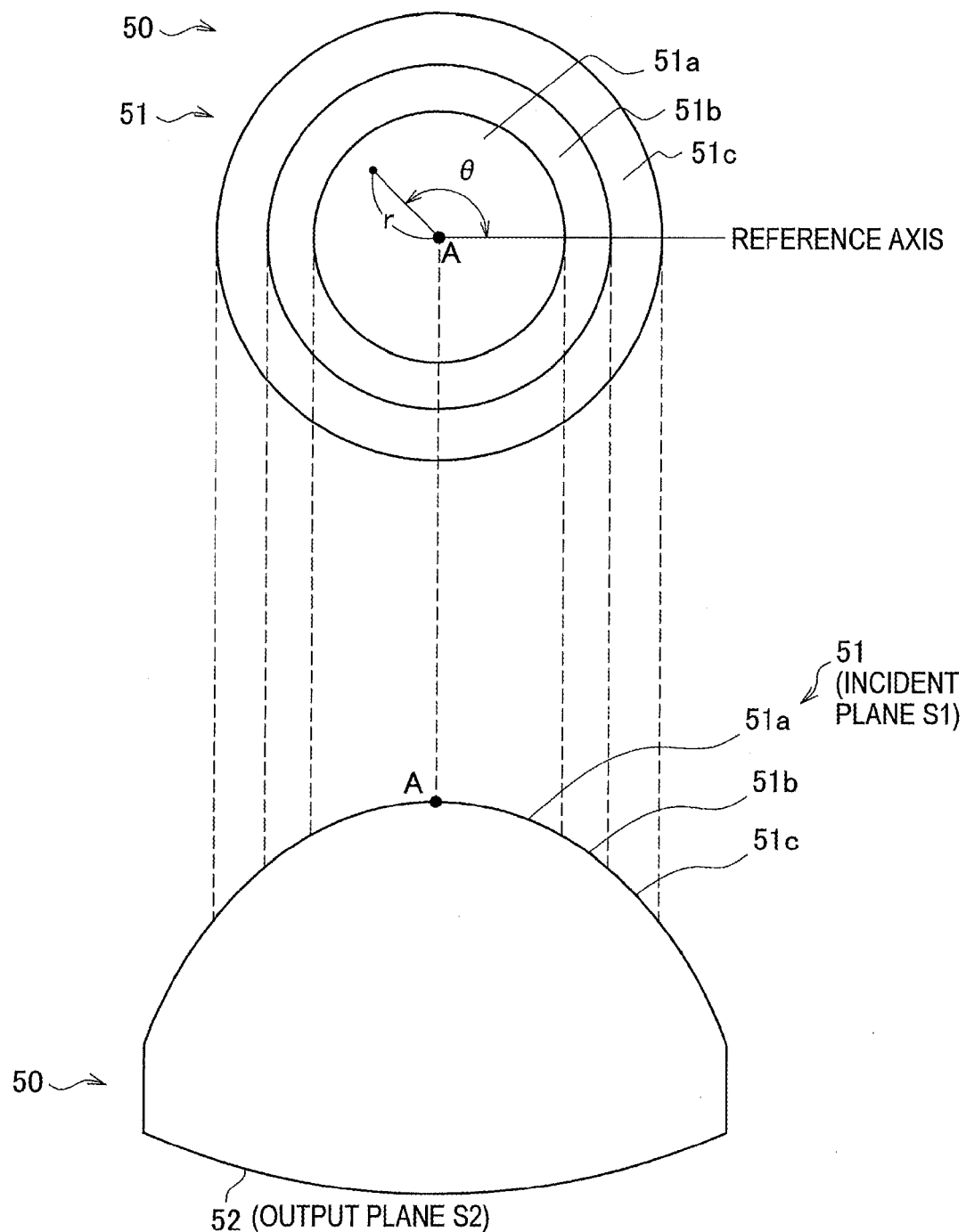
FIG. 3 is a plan view showing the structure of an objective lens and a sectional side view showing the structure of the objective lens.
Figure 4:
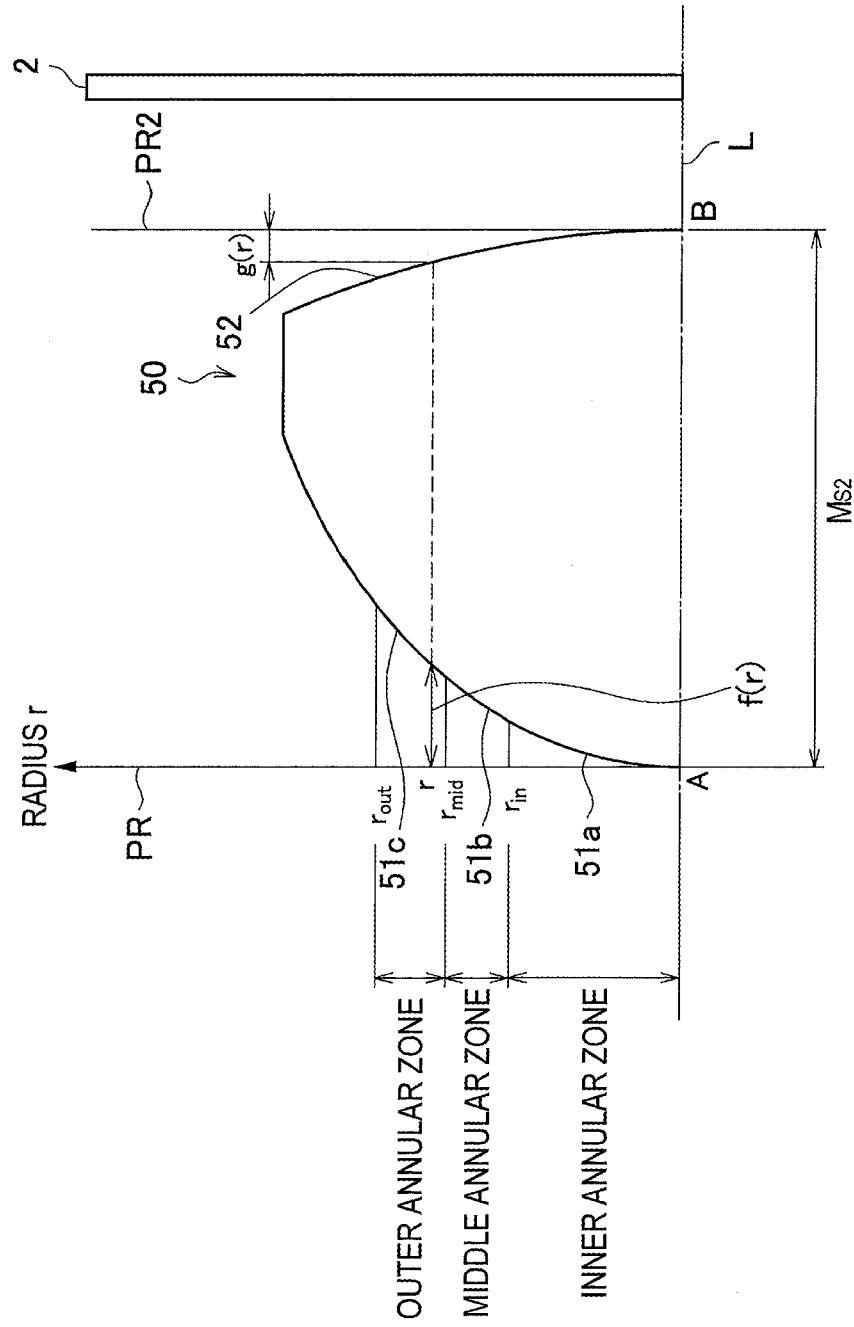
FIG. 4 is a sectional side view showing the structure of an objective lens.

The incident plane 51 is, as shown in FIGS. 3 and 4, convex in shape that has a point A, which is an intersection of the optical axis L and the incident plane 51, as the apex. In addition, the incident plane 51 has an inner annular zone 51$a$, a middle annular zone 51$b$, and an outer annular zone 51$c$.

The inner annular zone 51$a$ is, as shown in FIGS. 3 and 4, a substantially circular region having a radius $r_{in}$ with the point A as the center. That is, a point corresponding to the radius r of $0 \leq r \leq r_{in}$ belongs to the inner annular zone 51$a$. The middle annular zone 51$b$ is a substantially ring-shaped region formed outside the inner annular zone 51$a$ and having a width ($r_{mid}-r_{in}$) with the point A as the center. That is, a point corresponding to the radius r of $r_{in} \leq r \leq r_{mid}$ belongs to the middle annular zone 51$b$. The outer annular zone 51$c$ is a substantially ring-shaped region formed outside the middle annular zone 51$a$ and having a width ($r_{out}-r_{mid}$) with the point A as the center. That is, a point corresponding to the radius r of $r_{mid} < r \leq r_{out}$ belongs to the outer annular zone 51$c$.

Figure 5A:
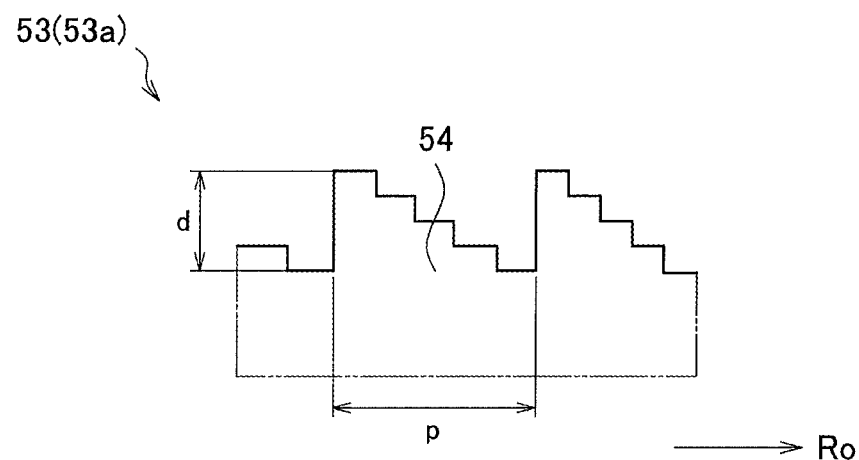
FIG. 5A is a sectional side view showing an example of a diffraction grating formed on an incident plane of an objective lens.
Figure 5B:
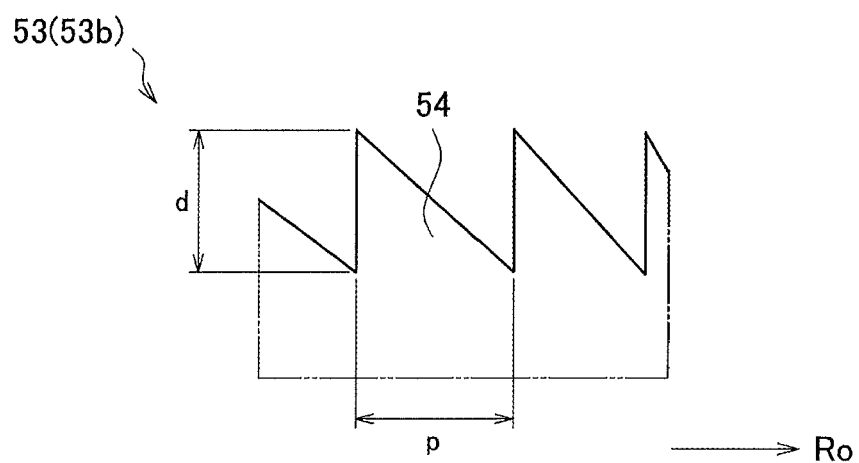
FIG. 5B is a sectional side view showing an example of a diffraction grating formed on an incident plane of an objective lens.

A diffraction grating 53 (a diffraction portion) 53 shown in FIGS. 5A and 5B, for example, is formed on each annular zone. Note that the diffraction grating 53 shown in FIGS. 5A and 5B is overlaid on the incident plane 51 of the objective lens 50. For the diffraction grating 53, a multi-level diffraction grating 53$a$ shown in FIG. 5A or a blazed diffraction grating 53$b$ shown in FIG. 5B may be used. The diffraction grating 53 formed on each inner annular zone is not limited thereto, and may be of any type. A diffraction grating 53 formed on the inner annular zone 51$a$ constitutes a first diffraction region, a diffraction grating 53 formed on the middle annular zone 51$b$ constitutes a second diffraction region, and a diffraction grating 53 formed on the outer annular zone 51$c$ constitutes a third diffraction region.

The arrow $R_0$ indicates the direction from the point A toward the outer rim of the objective lens 50. The depth d and the pitch p of the repetition unit 54 influence the value of an in-plane efficiency distribution function. The depth d is the length of the direction from the incident plane 51 toward the optical axis L, and the pitch p is the length of the direction from the point A toward the outer rim of the objective lens 50.

The aforementioned diffraction grating 53 is formed on each annular zone. Thus, a laser beam incident on each annular zone is diffracted by the diffraction grating 53. In this embodiment, among the diffracted laser beams, a laser beam that is parallel with the optical axis L will be referred to as a 0th order laser beam, a laser beam that moves in a direction away from the optical axis L will be referred to as a −nth order laser beam (n is a positive integer), and a laser beam that moves in a direction closer to the optical axis L will be referred to as a +nth order laser beam.

The inner annular zone 51$a$ can condense laser beams for BD, laser beams for DVD, and laser beams for CD on data recording portions of a BD, DV, and CD, respectively. That is, the inner annular zone 51$a$ splits a laser beam for BD into a plurality of diffracted laser beams through diffraction, and condenses the diffracted laser beams of a given order among the diffracted laser beams on the data recording portion of the BD. Thus, the inner annular zone 51$a$ condenses some of the laser beams incident on the inner annular zone 51$a$ on the data recording portion of the BD. The same holds true for laser beams for DVD and laser beams for CD.

The middle annular zone 51$b$ can condense laser beams for BD and laser beams for DVD on data recording portions of a BD and DVD, respectively. That is, the middle annular zone 51$b$ splits a laser beam for BD into a plurality of diffracted laser beams through diffraction, and condenses the diffracted laser beams of a given order among the diffracted laser beams on the data recording portion of the BD. Thus, the middle annular zone 51$b$ condenses some of the laser beams incident on the middle annular zone 51$b$ on the data recording portion of the BD. The same holds true for laser beams for DVD.

The outer annular zone 51$c$ can condense laser beams for BD on a data recording portion of a BD. That is, the outer annular zone 51$c$ splits a laser beam for BD into a plurality of diffracted laser beams through diffraction, and condenses the diffracted laser beams of a given order among the diffracted laser beams on the data recording portion of the BD. Thus, the outer annular zone 51$c$ condenses some of the laser beams incident on the outer annular zone 51$c$ on the data recording portion of the BD.

The shape of the incident plane 51 can be represented by the following Formula (1), for Example.

$$f(r) = ZDE + \frac{r^2}{(RDY_{S1})\left(1 + \sqrt{1 - (1 + K_{S1})\left(\frac{r}{(RDY_{S1})}\right)^2}\right)} + A_{S1}r^4 + B_{S1}r^6 + C_{S1}r^8 + D_{S1}r^{10} + E_{S1}r^{12} + F_{S1}r^{14} + G_{S1}r^{16} + H_{S1}r^{18} + I_{S1}r^{20} + \left(\frac{k}{\lambda_0}\right)(C_1 r^2 + C_2 r^4 + C_3 r^6 + C_4 r^8 + C_5 r^{10}) \quad (1)$$

Herein, f(r) represents, as shown in FIG. 4, the distance from a point (r,θ) on the incident plane 51 to a plane PR that passes through the point A and is perpendicular to the optical axis L. The coefficient ZDE represents the inter-plane distance on the axis (the distance on the optical axis L) from the PR plane to a reference plane of each of the inner annular zone, the middle annular zone, and the outer annular zone (a plane excluding the diffraction grating 53 from each annular zone). The coefficient $RDY_{S1}$ represents the radius of curvature of each of the inner annular zone, the middle annular zone, and the outer annular zone of the incident plane. In addition, symbols $K_{S1}$, $A_{S1}$ to $J_{S1}$ represent so-called aspherical coefficients, and are coefficients corresponding to a plane excluding the diffraction grating 53 from the incident plane 53. The coefficient is the designed wavelength. Symbols $C_1$ to $C_5$ are so-called diffraction plane coefficients, and are coefficients corresponding to the diffraction grating 53. The diffraction order k represents the order of, among the laser beams incident on the incident plane 51, the diffracted laser beam incident on the optical disc 2 and are condensed on the data recording portion of the optical disc 2. Such coefficients influence the value of the in-plane efficiency distribution function.

The incident plane 51 may be subjected to various types of AR (Anti Reflection) coating. Various parameters related to the AR coating (e.g., the type of the AR coating, the thickness, and the range (the range of the incident plane 51 covered with the AR coating)) influence the value of the in-plane efficiency distribution function The output plane 52 is convex in shape that has an intersection of the optical axis L and the output plane 52 as the apex. The shape of the output plane 52 is represented by the following Formula (2), for example.

$$g(r) = M_{S2} + \frac{r^2/(RDY_{S2})}{1 + \sqrt{1-(1+K_{S2})(r/(RDY_{S2}))^2}} + A_{S2}r^4 + B_{S2}r^6 + C_{S2}r^8 + D_{S2}r^{10} + E_{S2}r^{12} + F_{S2}r^{14} + G_{S2}r^{16} + H_{S2}r^{18} + J_{S2}r^{20} \quad (2)$$

Herein, g(r) represents the distance from a point (r,θ) on the output plane 52 to a plane PR2 that passes through the apex B of the output plane and is perpendicular to the optical axis L. The coefficient $M_{S2}$ is the thickness of the lens, and corresponds to the distance on the axis between the apex A of the incident plane and the apex B of the output plane. In addition, the coefficient $RDY_{S2}$ is the radius of curvature of the output plane. Symbols $K_{S2}$, $A_{S2}$ to $J_{S2}$ represent so-called aspherical coefficients, and are coefficients corresponding to the output plane 52. Such coefficients influence the value of the in-plane efficiency distribution function.

The output plane 52 may be subjected to various types of AR coating. Various parameters related to the AR coating (e.g., the type of the AR coating, the thickness, and the range (the range of the output plane 52 covered with the AR coating)) influence the value of the in-plane efficiency distribution function. Hereinafter, the shape of the objective lens 50 will be described with reference to a specific example.

[4-2. Example of Objective Lens]

Next, examples of the objective lens 50 will be described.

Example 1

Each annular zone and the output plane 52 of an objective lens 50 in accordance with Example 1 (hereinafter also referred to as an "objective lens 50-1") has parameters shown in Tables 1 and 2 below. Note that $r_{in}$=1.15 (mm), $r_{mid}$=1.44 (mm), and $r_{out}$=1.87 (mm). In addition, the objective lens 50-1 is made of resin, and has a refractive index of 1.551 with respect to a laser beam for BD (a laser beam with a wavelength of 405 (nm)) at room temperature, and has a lens thickness of $M_{S2}$=2.67 (mm).

TABLE 1

|  |  | Inner Annular Zone | Middle Annular Zone | Outer Annular Zone |
|---|---|---|---|---|
| Radius of Curvature | $RDY_{S1}$ | 1.481E+00 | 1.533E+00 | 1.510E+00 |
| Aspherical Coefficients | $K_{S1}$ | −6.169E−01 | −5.587E−01 | −6.213E−01 |
|  | $A_{S1}$ | 6.515E−03 | 1.705E−02 | 1.680E−02 |
|  | $B_{S1}$ | 1.802E−03 | 1.071E−03 | 6.278E−04 |
|  | $C_{S1}$ | −7.616E−04 | −1.025E−03 | −1.576E−04 |
|  | $D_{S1}$ | 1.819E−04 | −4.922E−04 | 1.100E−05 |
|  | $E_{S1}$ | 5.620E−04 | 3.478E−04 | 3.525E−05 |
|  | $F_{S1}$ | −4.022E−04 | 3.724E−05 | 8.436E−06 |
|  | $G_{S1}$ | 8.655E−05 | −2.457E−05 | −2.179E−06 |
|  | $H_{S1}$ | 0.000E+00 | 0.000E+00 | 0.000E+00 |
|  | $J_{S1}$ | 0.000E+00 | 0.000E+00 | 0.000E+00 |
| Designed Wavelength | $\lambda_0$ | 7.100E−04 | 7.100E−04 | 7.100E−04 |
| Diffraction Plane Coefficients | $C_1$ | −5.979E−03 | −1.660E−02 | −2.259E−03 |
|  | $C_2$ | 3.390E−04 | 3.446E−03 | 2.556E−03 |
|  | $C_3$ | −8.782E−05 | −2.583E−03 | −4.491E−04 |
|  | $C_4$ | 2.239E−05 | 9.931E−04 | −2.254E−05 |
|  | $C_5$ | −2.886E−06 | −1.403E−04 | −5.575E−06 |
| On-Axis Distance | ZDE | 0.000E+00 | 8.490E−03 | 4.633E−03 |
| Diffraction Order | k | 1 | 0 | 2 |

TABLE 2

|  |  | Output Plane |
|---|---|---|
| Aspherical Coefficients | $RDY_{S2}$ | −2.726E+00 |
|  | $K_{S2}$ | −4.988E+01 |
|  | $A_{S2}$ | 7.426E−02 |
|  | $B_{S2}$ | −4.339E−02 |
|  | $C_{S2}$ | 1.273E−02 |
|  | $D_{S2}$ | −1.545E−03 |
|  | $E_{S2}$ | 0.000E+00 |
|  | $F_{S2}$ | 0.000E+00 |
|  | $G_{S2}$ | 0.000E+00 |
|  | $H_{S2}$ | 0.000E+00 |
|  | $J_{S2}$ | 0.000E+00 |
| Lens Thickness | $M_{S2}$ | 2.670E+00 |

According to Table 1, the inner annular zone 51a condenses, among laser beams incident on the inner annular zone 51a, a 1st order diffracted laser beam on a data recording portion of a BD. The middle annular zone 51b condenses, among laser beams incident on the middle annular zone 51b, a 0th order diffracted laser beam on a data recording portion of a BD. The outer annular zone 51c condenses, among laser beams incident on the outer annular zone 51c, a 2nd order diffracted laser beam on a data recording portion of a BD.

Example 2

Figure 6:
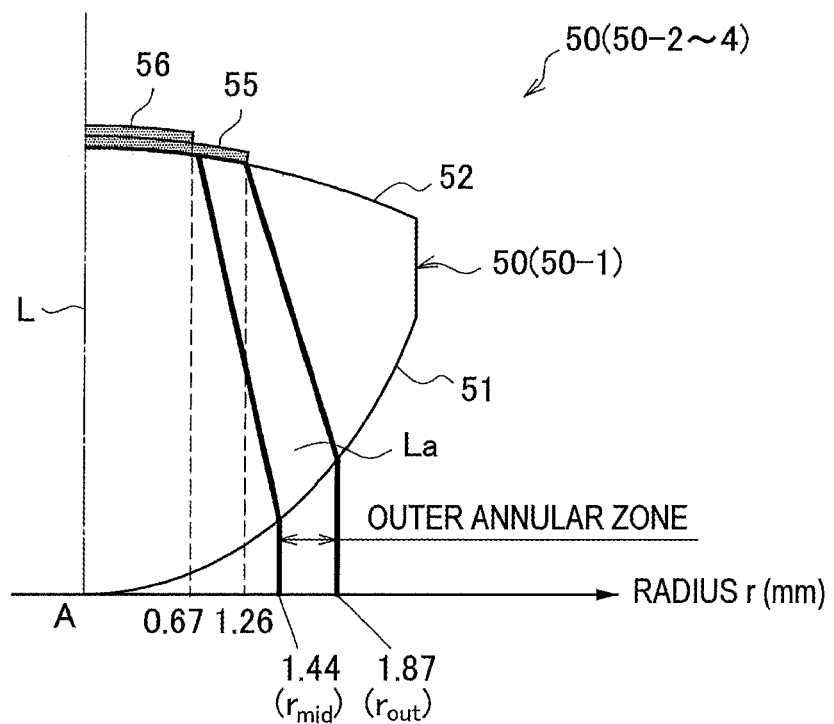
FIG. 6 is a sectional side view showing the structure of an objective lens.

An objective lens 50 in accordance with Example 2 (hereinafter also referred to as an "objective lens 50-2") is a lens obtained by subjecting the output plane 52 of the objective lens 50-1 to AR coatings 55 and 56 as shown in FIG. 6. The AR coating is an anti-reflection film. When the output plane of the objective lens is subjected to AR coating, it is possible to prevent reflection of light beams by the output plane and improve the transmittance of the objective lens. That is, it is possible to increase the proportion of, among laser beams incident on the incident plane, laser beams that are condensed on a data recording portion of an optical disc. Thus, it is also possible to, by changing the material, the thickness, the number of stacked layers, and the stacking order of the AR coating, perform control so that the transmittance has a predetermined value. Further, it is also possible to, by changing the material, the thickness, the number of stacked layers, and the stacking order of the AR coating in each region, perform control so that the transmittance of each region has a predetermined value. The AR coating 55 is formed on a region that satisfies 0≤r≤1.26 (mm) among regions of the output plane 52. The AR coating 56 is formed on a region that satisfies 0≤r≤0.67 (mm) among regions of the AR coating 55. Accordingly, a laser beam La incident on the outer annular zone 51c passes through only the AR coating 55 of the AR coatings 55 and 56. Meanwhile, a laser beam incident on the inner annular zone 51a or the middle annular zone 51b passes through both the AR coatings 55 and 56.

The AR coating 55 is obtained by staking AR coating materials AR1 and AR2. The refractive index of the AR coating material AR1 with respect to a laser beam for BD is 2.046, and the refractive index of the AR coating material AR2 with respect to a laser beam for BD is 1.506.

Specifically, the AR coating 55 is obtained by sequentially stacking AR coating materials AR1 (50.8), AR2 (102.7), AR1 (51.1), AR2 (126.8), AR1 (54.1), and AR2 (100.7) from a side closer to the output plane 52. Note that the value in parentheses indicates the thickness of each layer (unit: nm) (hereinafter the same). Meanwhile, the AR coating 56 is obtained by staking the AR coating material AR1 to a thickness of 40.0 (nm).

Example 3

An objective lens 50 in accordance with Example 3 (hereinafter also referred to as an "objective lens 50-3") is obtained by changing only the compositions of the AR coatings 55 and 56 of the structure of the objective lens 50-2. Specifically, the AR coating 55 is obtained by sequentially stacking AR coating materials AR1 (50.8), AR2 (102.7), and AR1 (51.1) from a side closer to the output plane 52. Meanwhile, the AR coating 56 is obtained by sequentially stacking AR2 (126.8), AR1 (54.1), and AR2 (100.7) from a side closer to the output plane 52.

Example 4

An objective lens 50 in accordance with Example 4 (hereinafter also referred to as an "objective lens 50-4") is obtained by changing only the compositions of the AR coatings 55 and 56 of the structure of the objective lens 50-2. Specifically, the AR coating 55 is obtained by sequentially stacking AR coating materials AR1 (25.6), AR2 (57.6), and AR1 (70.0) from a side closer to the output plane 52. Meanwhile, the AR coating 56 is obtained by sequentially stacking AR2 (10.9) and AR1 (29.6) from a side closer to the output plane 52. Examples of the objective lens 50 have been described above. The inventors have succeeded in, by focusing on an in-plane efficiency distribution function representing the in-plane efficiency distribution that is determined by the shape of the objective lens 50 and the AR coating applied to the objective lens 50 described above, deriving several evaluation parameters having a high correlation with the symbol error rate for BD. Hereinafter, the in-plane efficiency distribution function and the evaluation parameters will be described.

[In-Plane Efficiency Distribution Function]

Figure 7:
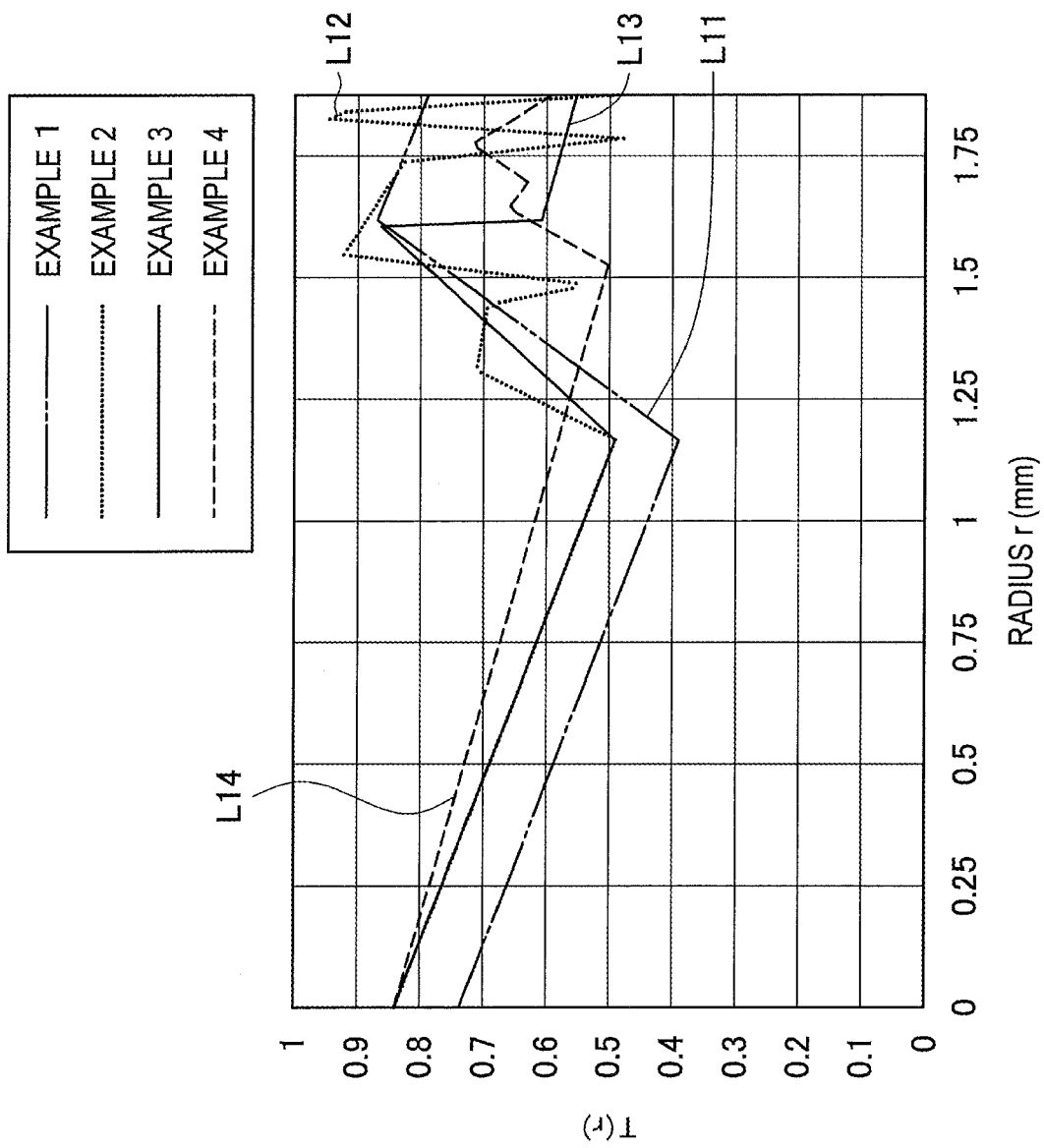
FIG. 7 is a graph showing an in-plane efficiency distribution function.

Next, among the aforementioned in-plane efficiency distribution functions, an in-plane efficiency distribution function corresponding to a laser beam for BD, that is, an in-plane efficiency distribution function T(r) for BD will be described with reference to FIG. 7. FIG. 7 shows the actual measured values of the in-plane efficiency distribution functions T(r) for BD in accordance with Examples 1 to 4. The in-plane efficiency distribution function T(r) for BD shows the proportion of, among laser beams for BD incident on the incident plane 51, laser beams for BD condensed on the data recording portion of the BD for each region of the incident plane 51. The in-plane efficiency distribution function T(r) can be determined by calculation if the shape of the objective lens 50 and the composition of the AR coating applied to the objective lens are determined. The inventors have found that, by focusing on the relationship between the in-plane efficiency distribution and the symbol error rate for BD, which has not been focused so far, several evaluation parameters derived from the in-plane efficiency distribution function T(r) have a high correlation with the symbol error rate for BD. The in-plane efficiency distribution function T(r) can be determined either by calculation on the basis of the specifications of the objective lens or by actually measuring the objective lens. The inventors have found that each of an evaluation parameter derived from the in-plane efficiency distribution function T(r) determined through calculated and an evaluation parameter derived from the in-plane efficiency distribution function T(r) determined through actual measurement has a high correlation with the symbol error rate for BD. Further, the inventors have also found that using the in-plane efficiency distribution function T(r) determined through actual measurement, in particular, has a higher correlation coefficient. Thus, the following examples will be described using the actual measured value of the in-plane efficiency distribution function T(r). This is because it is considered that as the diffraction portion on the surface of the objective lens 50 is very small, using the actually measured in-plane efficiency distribution function can eliminate influence such as variations in the production of objective lenses, and thus is closer to the actual condition. Note that although in-plane efficiency distribution functions corresponding to other laser beams can be similarly measured, as the symbol error rates for CD and DVD are lower than the symbol error rate for BD, it would be sufficient if in-plane efficiency distribution that can reduce the symbol error rate for BD can be designed. In addition, although the following description uses the actually measured in-plane efficiency distribution, it is also possible to use a design value of an in-plane efficiency distribution function determined through calculation. Further, in the present example, although the in-plane efficiency distribution is changed mainly by changing the presence/absence of AR coating or the composition of the AR coating, it is also possible to change the in-plane efficiency distribution only by changing the shape of the objective lens including the diffraction portion. If an in-plane efficiency distribution function is equivalent regardless of the presence or absence of AR coating, it is possible to realize a symbol error rate that is equal regardless of the presence or absence of AR coating. That is, the AR coating need not be applied.

That is, the in-plane efficiency distribution function T(r) for BD represents the transmission efficiency of a laser beam for BD at each point in the incident plane 51. Herein, the transmission efficiency of a laser beam for BD at a point (r1,θ) on the incident plane 51 is obtained by dividing the intensity of a laser beam for BD, which has been incident on the point (r1,θ) and condensed on the data recording portion of the BD, by the intensity of the laser beam for BD incident on the point (r1,θ). For example, in each of Examples 1 to 4, the inner annular zone 51 condenses a 1st order diffracted laser beam on a data recording portion of a BD. Thus, when $0 \leq r1 \leq r_{in}$, the transmission efficiency of a laser beam for BD at the point (r1,θ) is obtained by dividing the intensity of, among 1st order diffracted laser beams incident on the point (r1,θ), a laser beam condensed on a data recording plane of a BD by the intensity of the laser beam for BD incident on the point (r1,θ).

The in-plane efficiency distribution function T(r) for BD is a function of only the radius r, and does not depend on the rotation angle θ. That is, the in-plane efficiency distribution function T(r) for BD is a function that is symmetrical about the rotation angle θ.

Graph L11 shown in FIG. 7 shows an in-plane efficiency distribution function T(r) for BD in Example 1, and graph L12 shows an in-plane efficiency distribution function T(r) for BD in Example 2. Graph L13 shows an in-plane efficiency distribution function T(r) for BD in Example 3, and graph L14 shows an in-plane efficiency distribution function T(r) for BD in Example 4. All of the graphs L11 to L14 show the actual measured values. As shown, the transmission efficiency has various values in the incident plane 51. The inventors have found that several evaluation parameters that are calculated on the basis of such in-plane efficiency distribution functions T(r) for BD have a correlation with the symbol error rate. Hereinafter, such evaluation parameters will be described. Note that although evaluation parameters that are based on BD will be described hereinafter, evaluation parameters that are based on other optical discs can also be calculated in a similar way.

(Evaluation Parameter x)

First, an evaluation parameter x will be described. The evaluation parameter x is calculated on the basis of a point image intensity distribution function $I(\omega,\phi)$ and a lens transmission function (also referred to as MTF) $J(f,\theta')$ on the lens focal plane that condenses laser beams, which have been incident on an objective lens with in-plane efficiency distribution T(r), on a data plane of a BD disc. The point image intensity distribution function $I(\omega,\phi)$ represents the intensity distribution of a laser beam at each point of a lens focal plane (a plane that passes through the focal point of the objective lens 50 and is perpendicular to the optical axis L), and is represented by the following Formula (3). Note that an objective lens that has no diffraction portion on the surface thereof has efficiency distribution that is close to 100% across the entire incident plane of the lens, and thus involves few problems associated with the in-plane efficiency distribution. In contrast, an objective lens that has a diffraction portion on at least a part of a region of the surface of the lens has non-uniform in-plane efficiency distribution. Thus, the intensity of the laser beams condensed on a data plane of a disc is not uniform, which is known to influence the symbol error rate. The present disclosure clarifies the conditions of the in-plane efficiency distribution that can reduce the symbol error rate to be smaller than a predetermined value.

$$I(\omega,\phi) = \left| \int_0^{2\pi} \int_0^{r_{out}} T(r) e^{\frac{2\pi i}{\lambda} W(r,\theta)} e^{-i2\pi\left(\frac{\omega\cos\phi}{\lambda f_0} r\cos\theta + \frac{\omega\sin\phi}{\lambda f_0} r\sin\theta\right)} r dr d\theta \right|^2 \quad (3)$$

$$= \left| \int_0^{2\pi} \int_0^{r_{out}} T(r) e^{\frac{2\pi i}{\lambda} W(r,\theta)} e^{-i\frac{2\pi}{\lambda f_0} \omega r(\cos(\theta-\phi))} r dr d\theta \right|^2$$

Herein, each point on the lens focal plane is represented by the polar coordinates $(\omega,\phi)$. $\omega$ is the distance from each point on the lens focal plane to the optical axis L. $\phi$ is an angle by a perpendicular line, which is drawn from each point on the lens focal plane to the optical axis L, and a reference axis set on the lens focal plane. $\lambda$ is the wavelength of a laser beam for BD, that is, 405 (nm). $f_0$ is the focal length of the objective lens 50 with respect to a laser beam for BD. $W(r,\theta)$ is a phase term. However, as the spherical aberration on the data recording portion can be presumed to be sufficiently small, $W(r,\theta)=0$ in this embodiment.

A lens transmission function $J(f,\theta')$ is a function calculated by subjecting the point image intensity distribution function $I(\omega,\phi)$ to two-dimensional Fourier transform, and is represented by the following Formula (4).

$$J(f,\theta') = \int_0^{2\pi} \int_0^{\infty} J(\omega,\phi) e^{-i2\pi f\omega(\cos\phi\cos\theta' + \sin\phi\sin\theta')} \omega d\omega d\phi \quad (4)$$

$$= \int_0^{2\pi} \int_0^{\infty} J(\omega,\phi) e^{-i2\pi f\omega(\cos(\phi-\theta'))} \omega d\omega d\phi$$

Herein, each point on the Fourier transform plane is represented by polar coordinates $(f,\theta')$. f is the spatial frequency, and $\theta'$ is an angle between a perpendicular line, which is drawn from each point on the Fourier transform plane to the origin, and a reference axis set on the Fourier transform plane. Note that the in-plane efficiency distribution function T(r) for BD depends only on the radius r, and does not depend on the rotation angle θ. Such symmetry is also stored for each of the point image intensity distribution function $I(\omega,\phi)$ and the lens transmission function $J(f,\theta')$. That is, the point image intensity distribution function $I(\omega,\phi)$ and the lens transmission function $J(f,\theta')$ are substantially the functions of only a variable $\omega$ and the spatial frequency f, respectively.

Figure 8:
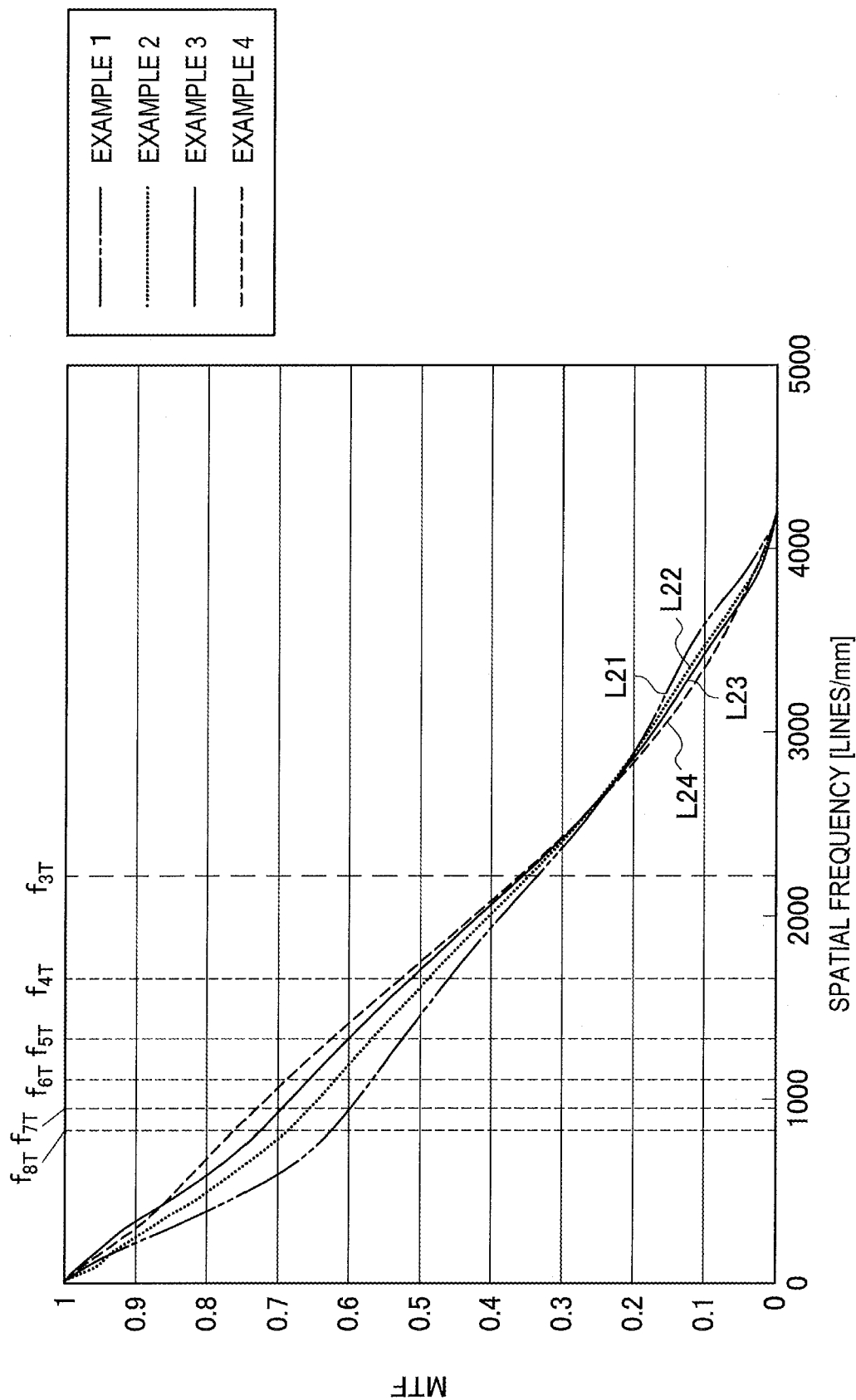
FIG. 8 is a graph showing a lens transmission function.

FIG. 8 shows lens transmission functions $J(f,\theta')$ of the objective lenses in Examples 1 to 4. Graph L21 shows a lens transmission function $J(f,\theta')$ in Example 1, and graph L22 shows a lens transmission function $J(f,\theta')$ in Example 2. Graph L23 shows a lens transmission function $J(f,\theta')$ in Example 3, and graph L24 shows a lens transmission functions $J(f,\theta')$ in Example 4. The lens transmission function $J(f,\theta')$ is standardized. Given the in-plane efficiency distribution function T(r) for BD in FIG. 7, the lens transmission function $J(f,\theta')$ can be uniformly determined from Formulae (3) and (4) above. The lens transmission function $J(f,\theta')$ is an index indicating that the larger the lens transmission function $J(f,\theta')$, the higher the contrast. Thus, FIG. 8 can be considered to represent the relationship between the spatial frequency and the contrast. In addition, as shown in FIG. 8, the relationship is typically such that a contrast with respect to a lower spatial frequency is higher, and a contrast with respect to a higher spatial frequency is lower. However, as is clear from the comparison among Examples 1 to 4 in FIG. 8, the relationship between the spatial frequency and the lens transmission function MTF or the contrast is not uniform. This also shows that the contrast would differ from objective lens to objective lens even at the same spatial frequency. In addition, the contrast being high is typically considered to show that the signal quality is high. That is, it is considered that an in-plane efficiency distribution function for BD of an objective lens determines the lens transmission function, and thus has a correlation with the signal quality or the symbol error rate for BD.

FIG. 8 also shows the spatial frequencies $f_{3T}$ to $f_{8T}$. The spatial frequencies $f_{3T}$ to $f_{8T}$ are spatial frequencies (inverse of pit lengths) corresponding to the pit lengths 3T to 8T of a BD, respectively. Note that 3T to 8T are symbols representing the pit lengths. In addition, the pit lengths of the BD also include 2T. The correspondence between such symbols, the actual lengths, and the spatial frequencies is shown in Table 3. Herein, in order to improve the symbol error rate for a BD, it is speculated that all of the lens transmission functions MTF at the spatial frequencies corresponding to the pit lengths 2T to 8T of a BD should be increased.

TABLE 3

| Symbol | Length (μm) | Spatial Frequency (Lines/mm) |
|---|---|---|
| 8T | 0.600 | 833.3 |
| 7T | 0.525 | 952.4 |
| 6T | 0.450 | 1111.1 |
| 5T | 0.375 | 1333.3 |
| 4T | 0.300 | 1666.7 |
| 3T | 0.225 | 2222.2 |
| 2T | 0.150 | 3333.3 |

However, according to FIG. 8, although the order of decreasing lens transmission function J(f,θ') at the pit lengths 3T to 8T of a BD is Examples 4, 3, 2, 1, the order of decreasing the lens transmission function J(f,θ') at the pit length 2T is the opposite, that is, Examples 1, 2, 3, 4. As described above, it would be not easy to implement an objective lens whose lens transmission function is large at all of pit lengths 2T to 8T of a BD. Meanwhile, the order of increasing symbol error rate measured using the objective lenses in Examples 1 to 4 is Examples 4, 3, 2, 1, which is equal to the order of decreasing lens transmission function J(f,θ') at the pit lengths 3T to 8T. The inventors have presumed determining the geometric mean of, among the values indicated by the lens transmission function J(f,θ'), the values corresponding to the pit lengths of a BD, and calculated the geometric mean while changing the pit lengths as the target of the geometric mean, and thus confirmed a correlation between the geometric mean value and the symbol error rate. Consequently, the inventors have confirmed that the geometric mean of lens transmission functions J(f,θ') corresponding to 1 to 6 pit lengths adequately selected from among 3T to 8T that are longer than the pit length 2T has a higher correlation with the symbol error rate than does the geometric mean of lens transmission functions J(f,θ') corresponding to 1 to 7 pit lengths adequately selected from among the pit lengths 2T to 8T by including the pit length 2T. On the basis of the result of such study, the inventors have determined a value, which is obtained by determining the geometric mean of the lens transmission functions $J(f_{3T},\theta')$ to $J(f_{8T},\theta')$ corresponding to the pit lengths 3T to 8T, respectively, of a BD, as an evaluation parameter x having a high correlation with the symbol error rate (SER) for BD. That is, the evaluation parameter x is defined by the following Formula (5). That is, the evaluation parameter x is calculated by determining the geometric mean of values corresponding to the pit lengths 3T to 8T of a BD among the values indicated by J(f,θ'). That is, the evaluation parameter x does not include a value related to the transmission function $J(f_{2T},\theta')$. This is because, if the value related to the transmission function $J(f_{2T},\theta')$ is included in the evaluation parameter x, the correlation between the evaluation parameter x and the SER for BD could be low.

$$x = \prod_{i=3}^{8} (J(f_{iT}))^{\frac{1}{6}} = (J(f_{3T}) \times J(f_{4T}) \times J(f_{5T}) \times \ldots \times J(f_{8T}))^{\frac{1}{6}} \quad (5)$$

Figure 9:
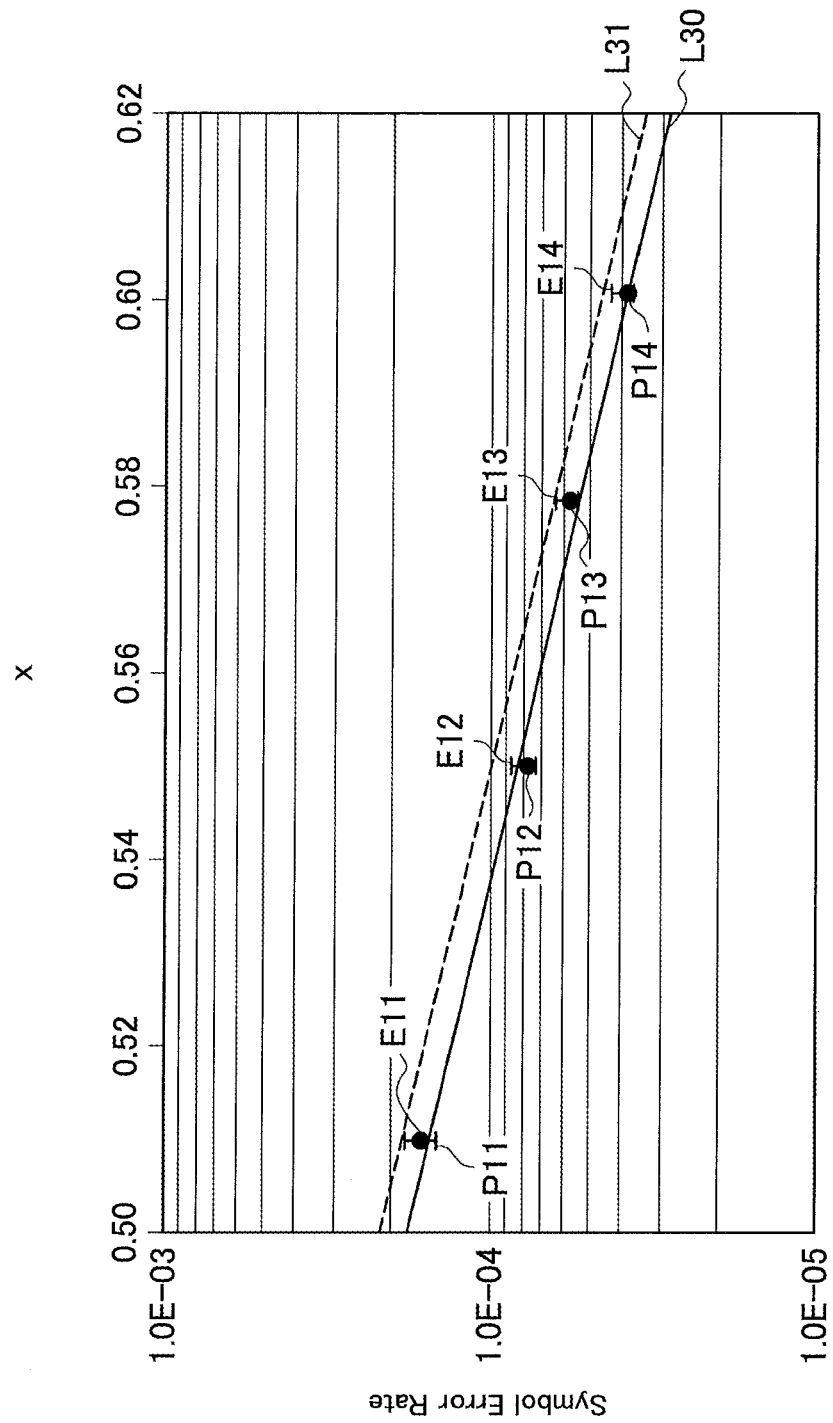
FIG. 9 is a graph showing the correspondence between an evaluation parameter x and the symbol error rate for BD (SER for BD)

FIG. 9 shows the correspondence between the evaluation parameter x in each example and the symbol error rate for BD (hereinafter also referred to as "SER for BD") measured using the objective lens 50 in each example. Note that the vertical axis indicates the logarithmic value of the SER for BD.

Although all of the pit lengths 3T to 8T are reflected by the evaluation parameter x in this embodiment, only some of the pit lengths 3T to 8T may be reflected by the evaluation parameter x. When a parameter corresponding to a pit length whose spatial frequency is low is used, in particular, for example, when a parameter corresponding to only 8T is used, or when a parameter corresponding to 7T to 8T, 6T to 8T, 5T to 8T, or 4T to 8T is used, a high correlation that is close to the correlation of when a parameter corresponding 3T to 8T is used was confirmed.

The inventors prepared a plurality of objective lenses 50 for each example, and measured the SER for BD for the objective lenses 50. A point P11 indicates the evaluation parameter x in Example 1 and the average value of the SER for BD measured for Example 1. Herein, the "average value of the SER for BD" is a value obtained by dividing the sum of the measured data values of the SER for BD by the number of pieces of the measured data of the SER for BD. An error bar E11 indicates the evaluation parameter x in Example 1 and the range of the SER for BD measured for Example 1.

Likewise, a point P12 indicates the evaluation parameter x in Example 2 and the average value of the SER for BD measured for Example 2. An error bar E12 indicates the evaluation parameter x in Example 2 and the range of the SER for BD measured for Example 2.

A point 13 indicates the evaluation parameter x in Example 3 and the average value of the SER for BD measured for Example 3. An error bar E13 indicates the evaluation parameter x in Example 3 and the range of the SER for BD measured for Example 3.

A point P14 indicates the evaluation parameter x in Example 4 and the average value of the SER for BD measured for Example 4. An error bar E14 indicates the evaluation parameter x in Example 4 and the range of the SER for BD measured for Example 4.

Table 4 shows the evaluation parameter x, the average value of the SER for BD, and the range of the SER for BD for each example.

TABLE 4

| | X | SER Average Value | SER Maximum Value | SER Minimum Value |
|---|---|---|---|---|
| Example 1 | 0.510 | 1.59E−04 | 2.06E−05 | 1.27E−05 |
| Example 2 | 0.550 | 7.70E−05 | 9.24E−06 | 3.85E−06 |
| Example 3 | 0.578 | 5.70E−05 | 6.27E−06 | 2.28E−06 |
| Example 4 | 0.601 | 3.80E−05 | 4.94E−06 | 1.14E−06 |

According to FIG. 9 and Table 4, the evaluation parameter x and the SER for BD seem to have a strong correlation. Thus, when a regression line of the evaluation parameters x in Examples 1 to 4 and all of the SERs for BD measured for Examples 1 to 4 is determined, an approximate straight line L30 with a correlation coefficient of 0.99 or higher is obtained. As described above, the evaluation parameter x and the logarithm of the SER for BD have a substantially linear relationship.

A function $S_1(x)$ indicating the approximate straight line L30 is represented by the following Formula (6).

$$S_1(x) = 0.38 \times e^{-15.33x} \quad (6)$$

By the way, the SER for BD has a specification value set thereon, and the value is $2 \times 10^{-4}$ (=2.0E−04). Thus, it is acceptable as long as the evaluation parameter x is set so that the value of the function $S_1(x)$ is less than the specification value. However, considering production errors (e.g., spherical aberration of the objective lens 50) and the like, the function $S_1(x)$ is preferably provided with a margin. Provided that the margin is 20%, it is acceptable as long as the evaluation parameter x satisfies the following Formula (7). Note that graph L31 shows a value obtained by providing the function $S_1(x)$ with the value of a margin. As shown by graph L31, the function $S_1(x)$ provided with a margin includes all of the SERs for BD measured for Examples 1 to 4. Hereinafter, the threshold of an evaluation parameter for setting the SER for BD to be less than the specification value will also be referred to as a "specification condition value." According to Formula (7), the specification condition value for the evaluation parameter x is 0.505.

$$S_1(x) \times 12 < 2 \times 10^{-4}$$

$$(0.38 \times e^{-15.33x}) \times 1.2 < 2 \times 10^{-4}$$

$$x > 0.505 \qquad (7)$$

Further, considering the aforementioned production errors and the like, it is further preferable that the SER for BD be a half of the specification value. In such a case, it is acceptable as long as the evaluation parameter x satisfies the following Formula (8).

$$S_1(x) \times 1.2 < 1 \times 10^{-4}$$

$$(0.38 \times e^{-15.33x}) \times 1.2 < 1 \times 10^{-4}$$

$$x > 0.550 \qquad (8)$$

Further, if x>0.560, the SER for BD becomes more stable. Thus, the objective lens 50 in accordance with the present disclosure at least has the evaluation parameter x that is greater than a value of 0.505. Note that the upper limit of the evaluation parameter x is not particularly limited. However, the higher the value of the evaluation parameter x, the lower the in-plane efficiency of the outer annular zone 51c. Thus, the value of the evaluation parameter x of when the efficiency of the outer annular zone 51 reaches a predetermined value may be set as the upper limit of the evaluation parameter x.

Note that in the specific design for increasing the evaluation parameter x (that is, for reducing the SER for BD), the ratio of the in-plane efficiency of the outer annular zone 51c to the in-plane efficiency of the inner annular zone 51a and the middle annular zone 51b may be set low.

(Evaluation Parameter y)

Next, an evaluation parameter y will be described. The inventors have arrived at, by focusing on the integration efficiency obtained by dividing a value, which is obtained by integrating the in-plane efficiency distribution function T(r) across a predetermined range in the radial direction of the lens plane, by the area of the lens plane corresponding to the predetermined range, deriving an evaluation parameter y and an evaluation parameter z described below. That is, the evaluation parameter y is calculated on the basis of the inner/middle annular zone integration efficiency $\eta_{(in+mid)}$ and the outer annular zone integration efficiency $\eta_{out}$. The inner/middle annular zone integration efficiency $\eta_{(in+mid)}$ is the ratio of a value, which is obtained by integrating the in-plane efficiency distribution function T(r) for BD over the inner annular zone 51a and the middle annular zone 51b, to the areas of the inner annular zone 51a and the middle annular zone 51b. The inner/middle annular zone integration efficiency $\eta_{(in+mid)}$ is specifically represented by the following Formula (9).

$$\eta_{(in+mid)} = (\int_0^{2\pi}\int_0^{r_{mid}} T(r) r dr d\theta) / (\int_0^{2\pi}\int_0^{r_{mid}} r dr d\theta) \qquad (9)$$

The outer annular zone integration efficiency $\eta_{out}$ is the ratio of a value, which is obtained by integrating the in-plane efficiency distribution function T(r) for BD over the outer annular zone 51c, to the area of the outer annular zone 51c. The outer annular zone integration efficiency $\eta_{out}$ is specifically represented by the following Formula (10).

$$\eta_{out} = (\int_0^{2\pi}\int_{r_{mid}}^{r_{out}} T(r) r dr d\theta) / (\int_0^{2\pi}\int_{r_{mid}}^{r_{out}} r dr d\theta) \qquad (10)$$

The evaluation parameter y is defined by the following Formula (11). That is, the evaluation parameter y is a value obtained by dividing the inner/middle annular zone integration efficiency $\eta_{(in+mid)}$ by the outer annular zone integration efficiency $\eta_{out}$.

$$y = \eta_{(in+mid)} / \eta_{out} \qquad (11)$$

Figure 10:
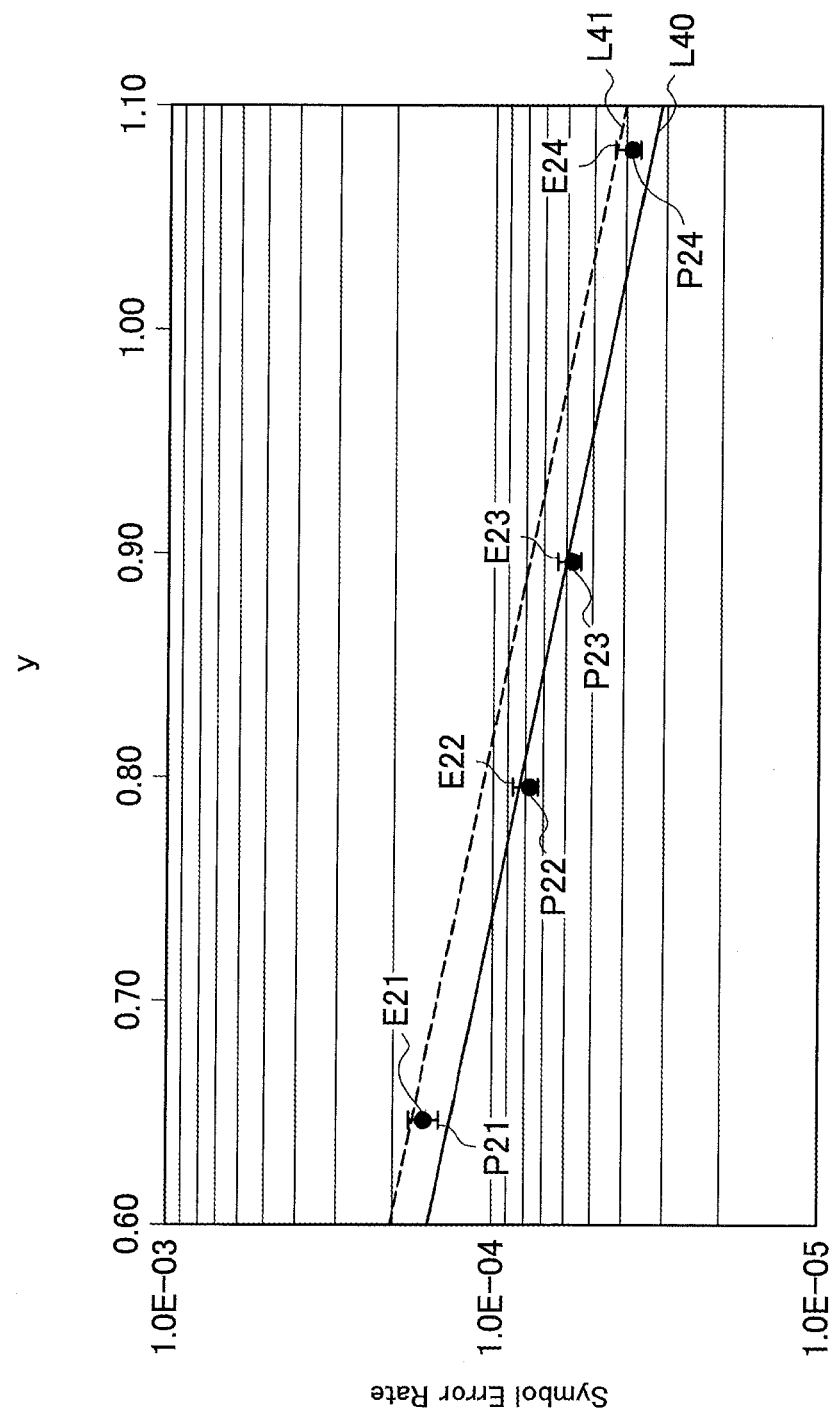
FIG. 10 is a graph showing the correspondence between an evaluation parameter y and the SER for BD.

FIG. 10 shows the correspondence between the evaluation parameter y in each example and the SER for BD measured using the objective lens 50 in each example. Note that the vertical axis indicates the logarithmic value of the SER for BD.

The inventors prepared a plurality of objective lenses 50 for each embodiment, and measured the SER for BD for the objective lenses 50. A point P21 indicates the evaluation parameter y in Example 1 and the average value of the SER for BD measured for Example 1. An error bar E21 indicates the evaluation parameter y in Example 1 and the range of the SER for BD measured in Example 1.

Likewise, a point P22 indicates the evaluation parameter y in Example 2 and the average value of the SER for BD measured for Example 2. An error bar E22 indicates the evaluation parameter y in Example 2 and the range of the SER for BD measured for Example 2.

A point P23 indicates the evaluation parameter y in Example 3 and the average value of the SER for BD measured for Example 3. An error bar E23 indicates the evaluation parameter y in Example 3 and the range of the SER for BD measured for Example 3.

A point P24 indicates the evaluation parameter y in Example 4 and the average value of the SER for BD measured for Example 4. An error bar E24 indicates the evaluation parameter y in Example 4 and the range of the SER for BD measured for Example 4.

Table 5 shows the evaluation parameter y, the average value of the SER for BD, and the range of the SER for BD for each example.

TABLE 5

| | y | SER Average Value | SER Maximum Value | SER Minimum Value |
|---|---|---|---|---|
| Example 1 | 0.646 | 1.586E−04 | 2.061E−05 | 1.268E−05 |
| Example 2 | 0.795 | 7.700E−05 | 9.240E−06 | 3.850E−06 |
| Example 3 | 0.896 | 5.700E−05 | 6.270E−06 | 2.280E−06 |
| Example 4 | 1.080 | 3.800E−05 | 4.940E−06 | 1.140E−06 |

According to FIG. 10 and Table 5, the evaluation parameter y and the SER for BD seem to have a strong correlation. Thus, when a regression line of the evaluation parameters y in Examples 1 to 4 and all of the SERs for BD measured for Examples 1 to 4 are determined through a least-squares method, an approximate straight line L40 with a correlation coefficient of 0.99 or higher is obtained. As described above, the evaluation parameter y and the logarithm of the SER for BD have a substantially linear relationship.

A function $S_2(y)$ indicating the approximate straight line L40 is represented by the following Formula (12).

$$S_2(y)=0.0011 \times e^{-3.24y} \quad (12)$$

By the way, the SER for BD has a specification value set thereon, and the value is $2 \times 10^{-4}$ (=2.0E−04). Thus, it is acceptable as long as the evaluation parameter y is set so that the value of the function $S_2(y)$ is less than the specification value. However, considering production errors and the like, the function $S_2(y)$ is preferably provided with a margin. Provided that the margin is 30%, it is acceptable as long as the evaluation parameter y satisfies the following Formula (13). Note that graph L41 shows a value obtained by providing the function $S_2(y)$ with a margin. As shown by graph L41, the function $S_2(x)$ provided with a margin includes all of the SERs for BD measured for Examples 1 to 4. According to Formula (13), the specification condition value for the evaluation parameter y is 0.607.

$$S_2(y) \times 1.3 < 2 \times 10^{-4}$$

$$(0.0011 \times e^{-3.24y}) \times 1.3 < 2 \times 10^{-4}$$

$$y > 0.607 \quad (13)$$

Further, considering the aforementioned production errors and the like, it is further preferable that the SER for BD be a half of the specification value. In such a case, it is acceptable as long as the evaluation parameter y satisfies the following Formula (14).

$$S_2(y) \times 1.3 < 1 \times 10^{-4}$$

$$(0.0011 \times e^{-3.24y}) \times 1.3 < 1 \times 10^{-4}$$

$$y=0.821 \quad (14)$$

Further, if y>0.890, the SER for BD becomes more stable. Thus, the objective lens 50 in accordance with the present disclosure at least has the evaluation parameter y that is greater than a value of 0.607. Note that the upper limit of the evaluation parameter y is not particularly limited.

According to the definition of the evaluation parameter y, in order to increase the evaluation parameter y (that is, to reduce the SER for BD), the inner/middle annular zone integration efficiency $\eta_{(in+mid)}$ may be increased or the outer annular zone integration efficiency $\eta_{out}$ may be reduced. Meanwhile, when the inner/middle annular zone integration efficiency $\eta_{(in+mid)}$ decreases, the value of the evaluation parameter y would also decrease, and the SER for BD would increase. In such a case, increasing the outer annular zone integration efficiency $\eta_{out}$ would have an adverse effect. That is, when the inner/middle annular zone integration efficiency $\eta_{(in+mid)}$ decreases, it would be necessary to also reduce the outer annular zone integration efficiency $\eta_{out}$ to increase the evaluation parameter y. When a single objective lens is split into three regions and each of the split regions is provided with a diffraction portion to support CD, DVD, and BD, the efficiency in each region would be the highest at the innermost circumference and would be lower in regions closer to the outer circumference. However, the efficiency of the innermost circumference of each region can be selected to a certain degree. However, how to set the efficiency of the innermost circumference of each region has not been known so far. Thus, in order to increase the efficiency across the entire outer annular zone, for example, the efficiency of the innermost circumference of the outer annular zone has been often set close to 100%. However, according to the present disclosure, it has been clarified that setting a laser beam, which is condensed on a data plane of a disc through the outer annular zone, to adequate brightness would contribute to improving the symbol error rate.

In addition, as is clear from the description of the aforementioned evaluation parameter x and evaluation parameter y, these parameters have a close relationship. That is, when the evaluation parameter y, which is obtained by dividing the inner/middle annular zone integration efficiency by the outer annular zone integration efficiency, is increased on the basis of the in-plane efficiency distribution T(r), there is a tendency that the lens transmission function at a spatial frequency of 3333 lines/mm corresponding to a pit length of 2T of the BD becomes small, and the lens transmission functions at spatial frequencies of 2222 lines/mm or less corresponding to the pit lengths of 3T to 8T become large. Thus, the evaluation parameter x that is calculated on the basis of the geometric mean of the lens transmission functions at the pit lengths of 3T to 8T having a high correlation with the SER would also increase. As described above, as the lens transmission functions can be uniformly determined from the in-plane efficiency distribution, it is natural that the evaluation parameter x and the evaluation parameter y have a close relationship.

Herein, although the evaluation parameter x is calculated on the basis of a point image intensity distribution function and a lens transmission function determined from the in-plane efficiency distribution, and is directly related to the signal quality of a BD and thus has high reliability, the evaluation parameter x is not a parameter that can be directly reflected in the lens design. Thus, the evaluation parameter x is somehow inconvenient. Meanwhile, the evaluation parameter y is a parameter that can be calculated from only the in-plane efficiency distribution and can be directly reflected in the design of an objective lens. Thus, in the specific design for increasing the evaluation parameter x (that is, for reducing the SER for BD), the ratio of the in-plane efficiency of the outer annular zone 51c to the in-plane efficiency of the inner annular zone 51a and the middle annular zone 51b may be set low.

(Evaluation Parameter z)

Next, an evaluation parameter z will be described. The evaluation parameter z is calculated on the basis of the inner annular zone integration efficiency $\eta_{in}$ and the outer annular zone integration efficiency $\eta_{out}$. The inner annular zone integration efficiency $\eta_{in}$ is the ratio of a value, which is obtained by integrating the in-plane efficiency distribution function T(r) for BD over the inner annular zone 51a, to the area of the inner annular zone 51a. The inner annular zone integration efficiency $\eta_{in}$ is specifically represented by the following Formula (15).

$$\eta_{in}=(\int_0^{2\pi}\int_0^{r_{in}}T(r)rdrd\theta)/(\int_0^{2\pi}\int_0^{r_{in}}rdrd\theta) \quad (15)$$

The evaluation parameter z is defined by the following Formula (16). That is, the evaluation parameter z is a value obtained by dividing the inner annular zone integration efficiency $\eta_{in}$ by the outer annular zone integration efficiency $\eta_{out}$.

$$z=\eta_{in}/\eta_{out} \quad (16)$$

Figure 11:
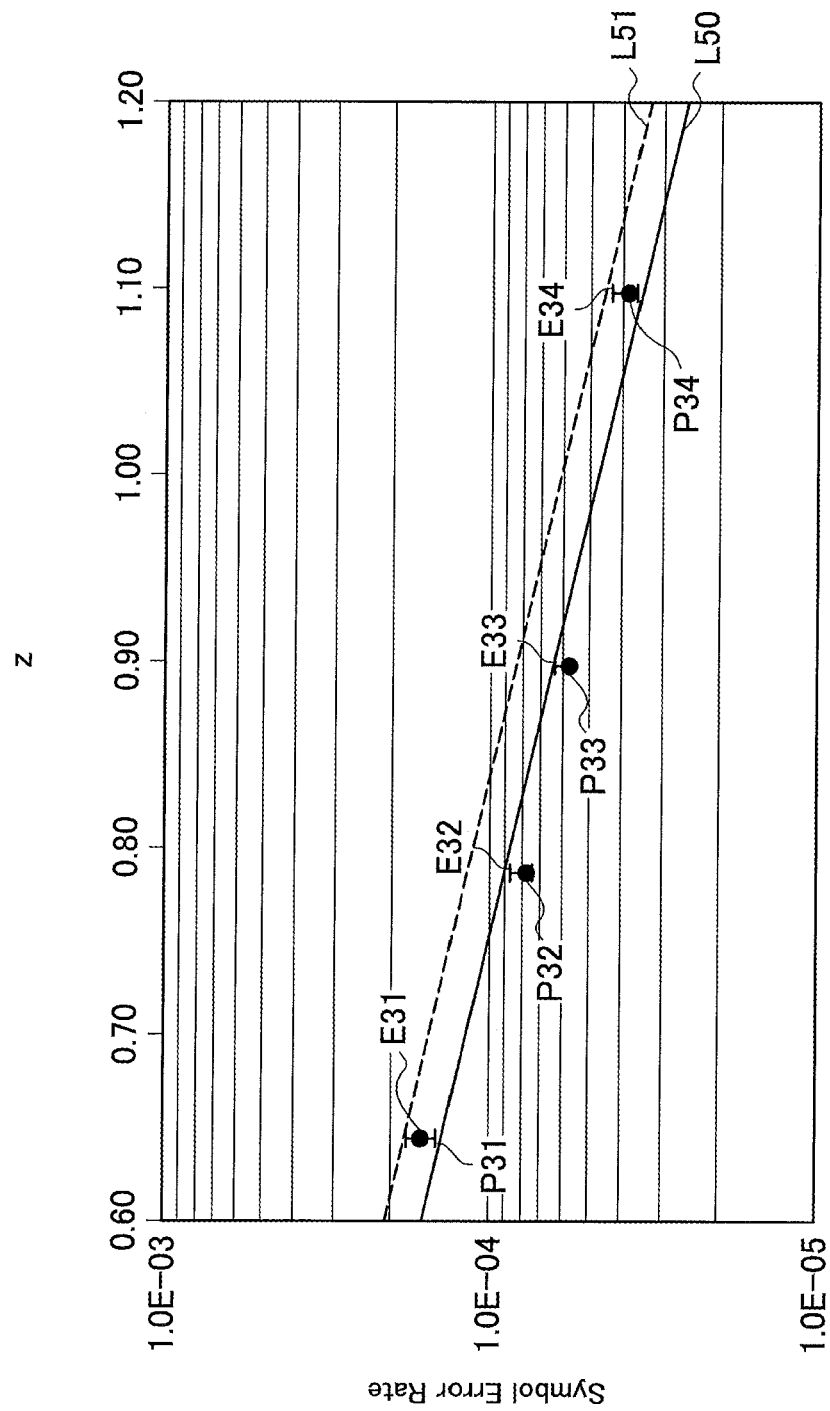
FIG. 11 is a graph showing the correspondence between an evaluation parameter z and the SER for BD.

FIG. 11 shows the correspondence between the evaluation parameter z in each example and the SER for BD measured using the objective lens 50 in each embodiment. Note that the vertical axis indicates the logarithmic value of the SER for BD.

The inventors prepared a plurality of objective lenses 50 for each embodiment, and measured the SER for BD for the objective lenses 50. A point P31 indicates the evaluation parameter z in Example 1 and the average value of the SER for BD measured for Example 1. An error bar E31 indicates the evaluation parameter z in Example 1 and the range of the SER for BD measured in Example 1.

Likewise, a point P32 indicates the evaluation parameter z in Example 2 and the average value of the SER for BD measured in Example 2. An error bar E32 indicates the evaluation parameter z in Example 2 and the range of the SER for BD measured for Example 2.

A point P33 indicates the evaluation parameter z in Example 3 and the average value of the SER for BD measured for Example 3. An error bar E33 indicates the evaluation parameter z in Example 3 and the range of the SER for BD measured for Example 3.

A point P34 indicates the evaluation parameter z in Example 4 and the average value of the SER for BD measured for Example 4. An error bar E34 indicates the evaluation parameter z in Example 4 and the range of the SER for BD measured for Example 4.

Table 6 shows the evaluation parameter z, the average value of the SER for BD, and the range of the SER for BD for each example.

TABLE 6

| | z | SER Average Value | SER Maximum Value | SER Minimum Value |
|---|---|---|---|---|
| Example 1 | 0.644 | 1.586E−04 | 2.061E−05 | 1.268E−05 |
| Example 2 | 0.786 | 7.700E−05 | 9.240E−06 | 3.850E−06 |
| Example 3 | 0.897 | 5.700E−05 | 6.270E−06 | 2.280E−06 |
| Example 4 | 1.097 | 3.800E−05 | 4.940E−06 | 1.140E−06 |

According to FIG. 11 and Table 6, the evaluation parameter z and the SER for BD seem to have a strong correlation. Thus, when a regression line of the evaluation parameters z in Examples 1 to 4 and all of the SERs for BD measured for Examples 1 to 4 are determined through a least-squares method, an approximate straight line L50 with a correlation coefficient of 0.99 or higher is obtained. As described above, the evaluation parameter z and the logarithm of the SER for BD have a substantially linear relationship.

A function $S_3(y)$ indicating the approximate straight line L50 is represented by the following Formula (17).

$$S_3(z) = 0.0001 \times e^{-3.06z} \quad (17)$$

By the way, the SER for BD has a specification value set thereon, and the value is $2 \times 10^{-4}$ (=2.0E−04). Thus, it is acceptable as long as the evaluation parameter z is set so that the value of the function $S_3(z)$ is less than the specification value. However, considering production errors and the like, the function $S_3(z)$ is preferably provided with a margin. Provided that the margin is 30%, it is acceptable as long as the evaluation parameter z satisfies the following Formula (18). Note that graph L51 shows a value obtained by providing the function $S_3(z)$ with the value of a margin. As shown by graph L51, the function $S_3(z)$ provided with a margin includes all of the SERs for BD measured for Examples 1 to 4. According to Formula (18), the specification condition value for the evaluation parameter z is 0.611.

$$S_3(z) \times 1.3 < 2 \times 10^{-4}$$

$$(0.001 \times e^{-3.06z}) \times 1.3 < 2 \times 10^{-4}$$

$$z > 0.611 \quad (18)$$

Further, considering the aforementioned production errors and the like, it is further preferable that the SER for BD be a half of the specification value. In such a case, it is acceptable as long as the evaluation parameter z satisfies the following Formula (19).

$$S_3(z) \times 1.3 < 1 \times 10^{-4}$$

$$(0.001 \times e^{-3.06z}) \times 1.3 < 1 \times 10^{-4}$$

$$z > 0.611 \quad (19)$$

Further, if z>0.910, the SER for BD becomes more stable. Thus, the objective lens 50 in accordance with the present disclosure at least has the evaluation parameter z that is greater than a value of 0.611. Note that the upper limit of the evaluation parameter z is not particularly limited.

According to the definition of the evaluation parameter z, in order to increase the evaluation parameter z (that is, to reduce the SER for BD), the inner annular zone integration efficiency $\eta_{in}$ may be increased or the outer annular zone integration efficiency $\eta_{out}$ may be reduced. Meanwhile, when the inner annular zone integration efficiency $\eta_{in}$ decreases, the value of the evaluation parameter z would also decrease, and the SER for BD would increase. In such a case, increasing the outer annular zone integration efficiency $\eta_{out}$ would have an adverse effect. That is, when the inner annular zone integration efficiency $\eta_{in}$ decreases, it would be necessary to also reduce the outer annular zone integration efficiency $\eta_{out}$ to increase the evaluation parameter z.

The aforementioned evaluation parameters x, y, and z work in conjunction with each other in principle. Thus, when any one of the evaluation parameters x, y, and z becomes greater than the specification condition value, the other evaluation parameters also typically become greater than the specification condition values. However, as the evaluation parameter z does not include a value related to the middle annular zone 51b, the evaluation parameter z is not influenced by the state of the middle annular zone 51b. Meanwhile, each of the evaluation parameters x and y includes a value related to the middle annular zone 51b. Thus, depending on the state of the middle annular zone 51b, there may be a case where the evaluation parameter z is less than or equal to the specification condition value but each of the evaluation parameters x and y is greater than the specification condition value or a case where the evaluation parameter z is greater than or equal to the specification condition value but each of the evaluation parameters x and y is less than the specification condition value. That is, there is a case where the evaluation parameter z is less than or equal to the specification condition value but the SER for BD is less than the specification value or a case where the evaluation parameter z is greater than the specification condition value but the SER for BD is greater than or equal to the specification value. Thus, the evaluation parameters x and y relatively have higher reliability than the evaluation parameter z. However, as the evaluation parameter z does not include a value related to the middle annular zone 51b, there is an advantage that the evaluation parameter z can be easily calculated than the evaluation parameters x and y. Thus, using the evaluation parameter z can reduce the time needed for designing an objective lens.

As described above, according to the technology of the present disclosure, each of the evaluation parameters x, y, and z is greater than the specification condition value. Thus, the SER for BD can be less than the specification value. Thus, according to the technology of the present disclosure, variations in the SER for BD can be reduced. Note that when each of the evaluation parameters x, y, and z becomes greater than the specification condition value, a BD, which is the optical disc 2 with the highest precision among a BD, DVD, and CD, has a symbol error rate that is less than the specification value. Thus, when each of the evaluation parameters x, y, and z becomes greater than the specification condition value, it is expected that the other optical discs 2 also have symbol error rates that are less than the specification value.

Further, the evaluation parameters x, y, and z are quantitative guidelines for reducing the SER for BD. That is, a designer of an objective lens can, by designing an objective lens such that each of the evaluation parameters x, y, and z becomes greater than the specification condition value, easily design an objective lens whose SER for BD is less than the specification value. A designer of an objective lens that is compatible with three wavelengths corresponding to three types of a BD, DVD, and CD, respectively, can, by forming a diffraction portion on each of an inner annular zone, a middle annular zone, and an outer annular zone of a laser beam incident plane, and adjusting the lens shape such as an aspherical coefficient and a diffraction plane coefficient so that laser beams with three wavelengths are condensed on different data planes of the three types of discs, respectively, set aberration such as aspherical aberration to be within a predetermined range and adjust the evaluation parameters x, y, and z. In addition, it is also possible to adjust the evaluation parameters x, y, and z by adjusting the type (material), the thickness, the number of stacked layers, the stacking order, and the range (width) of the AR coating.

Specifically, a designer of an objective lens designs the lens shape such as the aforementioned aspherical coefficient and diffraction plane coefficient, the structure of the AR coating, and the like, and actually measures or simulates (identifies) an in-plane efficiency distribution function T(r) for BD for an objective lens that conforms to such design values.

Herein, a method of actually measuring an in-plane efficiency distribution function T(r) for BD will be described with reference to FIG. 12. A designer of an objective lens actually measures an in-plane efficiency distribution function T(r) for BD using a measuring apparatus 100 shown in FIG. 12, for example. The measuring apparatus 100 includes a laser light source 101, a collimator lens 102, a beam splitter 103, a shutter 104, a mirror surface body 105, cover glass 107, a concave mirror surface body 108, a converging lens 109, an iris 110, and an image sensor 111. A laser light source 101 is capable of emitting laser beams 101a for BD. The mirror surface body 105 has a reference (standard) mirror surface 105a. The thickness of the cover glass 107 is 0.1 mm. The concave mirror surface body 108 has a reference (standard) spherical surface 108a. The image sensor 111 is, for example, a CCD camera.

The designer actually measures an in-plane efficiency distribution function T(r) for BD in the following procedures.

Figure 12:
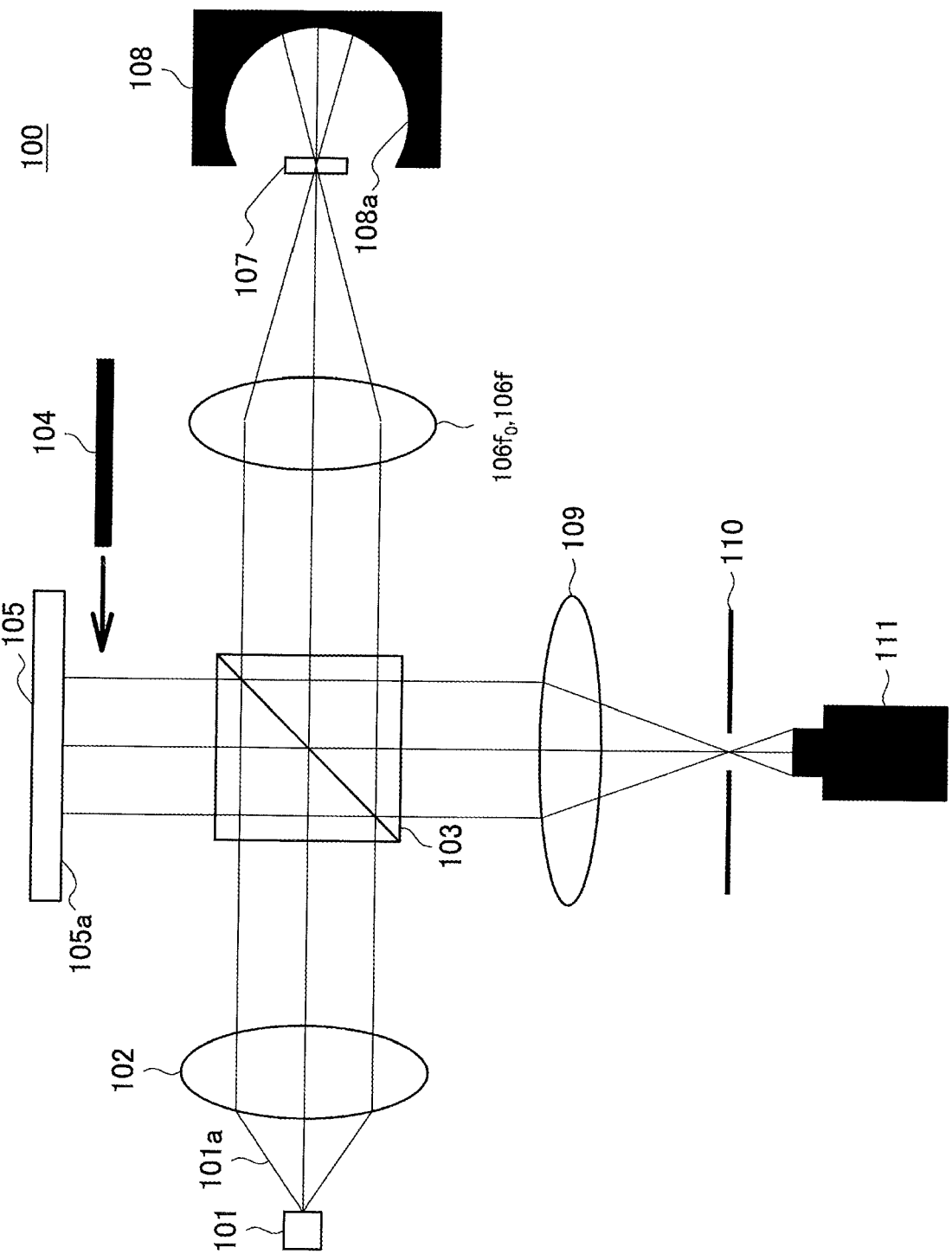
FIG. 12 is an explanatory diagram showing the schematic configuration of a measuring apparatus that measures an in-plane efficiency distribution function.

(1) Set an objective lens $106_{f0}$ (NA=0.85) whose in-plane efficiency distribution function for BD is known ($T_0(r)$) at a predetermined position in the measuring apparatus 100 (a position shown in FIG. 12).

(1-1) Cause the image sensor 111 to receive reflected light beams from the reference mirror surface 105a and the reference spherical surface 108a via the converging lens 109 and the iris 110. An operator adjusts the position and attitude of the objective lens $106_{f0}$ while viewing an output image from the image sensor 111, that is, interference fringes.

(1-2) Insert the shutter 104 in an optical path on the mirror surface body 105 side, and cause the image sensor 111 to receive only reflected light beams from the reference spherical surface 108a via the converging lens 109 and the iris 110, thereby obtaining an image of the objective lens $106_{f0}$.

(1-3) Integrate the luminance of the obtained image of the objective lens $106_{f0}$ on a circumference to calculate the circumference integrated value $L_0(r)$ and determine $k(=L_0(r)/T_0(r))$. Herein, the circumference integrated value $L_0(r)$ can be obtained by dividing the total quantity of light in an annular zone by the area of the annular zone. The total quantity of light in the annular zone is the value of the total sum of the luminance of each pixel on the circumference of the radius r. The area of the annular zone is the value of the total sum of the areas of the pixels.

(2) Set a measurement target objective lens 106f (NA=0.85) at a predetermined position in the measuring apparatus 100 (a position shown in FIG. 12).

(2-1) Cause the image sensor 111 to receive light beams from the reference mirror surface 105a and the reference spherical surface 108a via the converging lens 109 and the iris 110. An operator adjusts the position and the attitude of the objective lens 106f while viewing an output image from the image sensor 111, that is, interference fringes.

(2-2) Insert the shutter 104 in an optical path on the mirror surface 105 side, and cause the image sensor 111 to receive only reflected light beams from the reference spherical surface 108a via the converging lens 109 and the iris 110, thereby obtaining an image of the objective lens 106f.

(2-3) Integrate the luminance of the obtained image of the objective lens 106f on a circumference to calculate the circumference integrated value L(r) and obtain an in-plane efficiency distribution function for BD T(r)=L(r)/k. Herein, the circumference integrated value L(r) is obtained by dividing the total quantity of light in the annular zone by the area of the annular zone.

Then, the designer calculates the evaluation parameters x, y, and z on the basis of the in-plane efficiency distribution function T(r) for BD, and checks if each of the parameters is greater than at least the specification condition value. The designer adjusts the design (specifically, for example, the lens shape such as an aspherical coefficient or a diffraction plane coefficient; the type (material), the thickness, the number of stacked layers, the stacking order, and the range (width) of the AR coating; and the like) and repeats similar processes until satisfactory evaluation parameters x, y, and z are obtained. Accordingly, the designer can surely design and manufacture an objective lens whose SER for BD is less than the specification value.

The evaluation parameters x, y, and z have a strong correlation with the SER for BD. In addition, the evaluation parameters x, y, and z have substantially a linear relationship with the logarithm of the SER. Thus, it is possible to easily set the range of the evaluation parameters x, y, and z at which the SER for BD is less than the specification value.

Further, the evaluation parameter x is calculated on the basis of the lens transmission function $J(f,\theta')$, which is calculated on the basis of the in-plane efficiency distribution function T(r) for BD, and the pit lengths 3T to 8T. Thus, as the evaluation parameter x is a value for which both the in-plane efficiency distribution function T(r) for BD and the pit lengths 3T to 8T are taken into consideration, the evaluation parameter x is highly reliable as an evaluation parameter related to the symbol error rate.

The evaluation parameter x is calculated by determining the geometrical mean of, among the values indicated by the lens transmission functions $J(f,\theta')$, the values corresponding to the pit lengths 3T to 8T. Thus, as the evaluation parameter x is a value for which a value that is closely related to the BD, in particular, among the lens transmission functions $J(f,\theta')$ closely related to the signal quality are taken into consideration, the evaluation parameter x is highly reliable as an evaluation parameter related to the symbol error rate.

Further, as each of the evaluation parameters y and z is a value obtained by integrating the in-plane efficiency distribution function T(r) for BD, the evaluation parameters y and z are values that more accurately reflect the in-plane efficiency distribution function T(r) for BD. Thus, the evaluation parameters y and z are highly reliable as evaluation parameters related to the symbol error rate.

In particular, the evaluation parameters y and z are calculated on the basis of the inner annular zone integration efficiency $\eta_{in}$, the inner/middle annular zone integration efficiency $\eta_{(in+mid)}$, and the outer annular zone integration efficiency $\eta_{out}$. Thus, the evaluation parameters y and z are values that reflect, among the in-plane efficiency distribution functions T(r) for BD, the value of each annular zone. Thus, the evaluation parameters y and z are highly reliable as evaluation parameters related to the symbol error rate.

Further, the evaluation parameter y is a value obtained by dividing the inner/middle annular zone integration efficiency $\eta_{(in+mid)}$ by the outer annular zone integration efficiency $\eta_{out}$. Thus, as the evaluation parameter y is a value that reflects, among the in-plane efficiency distribution functions T(r) for BD, the values of all annular zones, the evaluation parameter y is highly reliable as an evaluation parameter related to the symbol error rate.

Further, the evaluation parameter z is a value obtained by dividing the inner annular zone integration efficiency $\eta_{in}$ by the outer annular zone integration efficiency $\eta_{out}$. Thus, as the evaluation parameter z is a value that reflects, among the in-plane efficiency distribution functions T(r) for BD, the values of the inner annular zone 51a and the outer annular zone 51c, the evaluation parameter z is highly reliable as an evaluation parameter related to the symbol error rate. Further, the evaluation parameter z has an advantage in that it is easy to calculate as it does not include an in-plane efficiency distribution function T(r) for BD related to the middle annular zone 51b.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

It should be understood by those skilled in the art that various modifications, combinations, sub-combinations and alterations may occur depending on design requirements and other factors insofar as they are within the scope of the appended claims or the equivalents thereof.

For example, although the evaluation parameters x, y, and z related to a BD are calculated in the aforementioned embodiments, the present technology is not limited thereto. For example, evaluation parameters related to a CD or DVD may also be calculated in a similar way.

Additionally, the present technology may also be configured as below.

(1) An objective lens comprising a diffraction portion provided on a laser beam incident plane or a laser beam output plane of the objective lens, wherein
the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein
first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc, and
an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

(2). The objective lens according to (1), wherein the evaluation parameter is calculated on the basis of, among values indicated by lens transmission functions calculated on the basis of the in-plane efficiency distribution function, values corresponding to pit lengths related to predetermined pits formed in the data recording portion.

(3) The objective lens according to (2), wherein the evaluation parameter is calculated by determining a geometrical mean of values corresponding to pit lengths related to the predetermined pits among the values indicated by the lens transmission functions.

(4) The objective lens according to (3), wherein
the predetermined pits are 3T to 8T, and
the evaluation parameter has a value greater than 0.505.

(5) The objective lens according to (4), wherein the evaluation parameter has a value greater than 0.550.

(6) The objective lens according to any one of (1) to (5), wherein the evaluation parameter is calculated on the basis of integration efficiency that is obtained by dividing a value, which is obtained by integrating the in-plane efficiency distribution function over a predetermined range in a radial direction from the optical axis of the incident plane, by an area of the diffraction portion corresponding to the predetermined range.

(7) The objective lens according to (6), wherein the evaluation parameter is calculated on the basis of inner/middle annular zone integration efficiency that is obtained by dividing a value, which is obtained by integrating the in-plane efficiency distribution function over the first diffraction region and the second diffraction region, by areas of the first diffraction region and the second diffraction region, and outer annular zone integration efficiency that is obtained by integrating the in-plane efficiency distribution function over the third diffraction region, by an area of the third diffraction region.

(8) The objective lens according to (7), wherein the evaluation parameter is a value obtained by dividing the inner/middle middle annular zone integration efficiency by the outer annular zone integration efficiency, and has a value greater than 0.607.

(9) The objective lens according to (8), wherein the evaluation parameter has a value greater than 0.821.

(10) The objective lens according to (6), wherein the evaluation parameter is calculated on the basis of inner annular zone integration efficiency that is obtained by dividing a value, which is obtained by integrating the in-plane efficiency distribution function over the first diffraction region, by an area of the first diffraction region, and outer annular zone integration efficiency that is obtained by dividing a value, which is obtained by integrating the in-plane efficiency distribution function over the third diffraction region, by an area of the third diffraction region.

(11) The objective lens according to (10), wherein the evaluation parameter is a value obtained by dividing the inner annular zone integration efficiency by the outer annular zone integration efficiency, and has a value greater than 0.611.

(12) The objective lens according to (11), wherein the evaluation parameter has a value greater than 0.838.

(13) An optical pickup device comprising an objective lens, the objective lens including a diffraction portion provided on a laser beam incident plane or a laser beam output plane of the objective lens, wherein the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc, and an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

(14) An optical disc device comprising an objective lens, the objective lens including a diffraction portion provided on a laser beam incident plane or a laser beam output plane of the objective lens, wherein the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc, and an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

(15) A method of designing an objective lens, comprising:

forming a diffraction portion on at least one of an incident plane or an output plane of the objective lens, the diffraction portion including a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc;

identifying an in-plane efficiency distribution function that indicates a proportion of, among the first laser beams incident on the diffraction portion, the first laser beams condensed on the data recording portion of the first optical disc in association with a distance from an optical axis of the incident plane in a radial direction;

calculating, on the basis of the in-plane efficiency distribution function, an evaluation parameter having a correlation with a symbol error rate corresponding to the first optical disc; and adjusting a design of the objective lens so that the evaluation parameter has a value corresponding to the symbol error rate that is less than a predetermined value.

The present disclosure contains subject matter related to that disclosed in Japanese Priority Patent Application JP 2011-194712 filed in the Japan Patent Office on Sep. 7, 2011, the entire content of which is hereby incorporated by reference.

What is claimed is:

1. An objective lens comprising a diffraction portion provided on a laser beam incident plane or a laser beam output plane of the objective lens, wherein the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc, and wherein the objective lens is configured such that an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

2. The objective lens according to claim 1, wherein the evaluation parameter is calculated on the basis of, among values indicated by lens transmission functions calculated on the basis of the in-plane efficiency distribution function, values corresponding to pit lengths related to predetermined pits formed in the data recording portion.

3. The objective lens according to claim 2, wherein the evaluation parameter is calculated by determining a geometrical mean of values corresponding to pit lengths related to the predetermined pits among the values indicated by the lens transmission functions.

4. The objective lens according to claim 3, wherein
the predetermined pits are 3T to 8T, and
the evaluation parameter has a value greater than 0.505.

5. The objective lens according to claim 4, wherein the evaluation parameter has a value greater than 0.550.

6. The objective lens according to claim 1, wherein the evaluation parameter is calculated on the basis of integration efficiency that is obtained by dividing a value, which is obtained by integrating the in-plane efficiency distribution function over a predetermined range in a radial direction from the optical axis of the incident plane, by an area of the diffraction portion corresponding to the predetermined range.

7. The objective lens according to claim 6, wherein the evaluation parameter is calculated on the basis of inner/middle annular zone integration efficiency that is obtained by dividing a value, which is obtained by integrating the in-plane efficiency distribution function over the first diffraction region and the second diffraction region, by areas of the first diffraction region and the second diffraction region, and outer annular zone integration efficiency that is obtained by integrating the in-plane efficiency distribution function over the third diffraction region, by an area of the third diffraction region.

8. The objective lens according to claim 7, wherein the evaluation parameter is a value obtained by dividing the inner/middle annular zone integration efficiency by the outer annular zone integration efficiency, and has a value greater than 0.607.

9. The objective lens according to claim 8, wherein the evaluation parameter has a value greater than 0.821.

10. The objective lens according to claim 6, wherein the evaluation parameter is calculated on the basis of inner annular zone integration efficiency that is obtained by dividing a value, which is obtained by integrating the in-plane efficiency distribution function over the first diffraction region, by an area of the first diffraction region, and outer annular zone integration efficiency that is obtained by dividing a value, which is obtained by integrating the in-plane efficiency distribution function over the third diffraction region, by an area of the third diffraction region.

11. The objective lens according to claim 10, wherein the evaluation parameter is a value obtained by dividing the inner annular zone integration efficiency by the outer annular zone integration efficiency, and has a value greater than 0.611.

12. The objective lens according to claim 11, wherein the evaluation parameter has a value greater than 0.838.

13. An optical pickup device comprising an objective lens, the objective lens including a diffraction portion provided on a laser beam incident plane or a laser beam output plane of the objective lens, wherein
the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc,
wherein the objective lens is configured such that an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

14. An optical disc device comprising an objective lens, the objective lens including a diffraction portion provided on a laser beam incident plane or a laser beam output plane of the objective lens, wherein
the diffraction portion includes a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc,
wherein the objective lens is configured such that an evaluation parameter, which is calculated on the basis of an in-plane efficiency distribution function that indicates a proportion of, among the first laser beams incident on the diffraction portion, the first laser beams condensed on the data recording portion of the first optical disc in association with a distance from an optical axis of the incident plane in a radial direction and which has a correlation with a symbol error rate corresponding to the first optical disc, has a value corresponding to the symbol error rate that is less than a predetermined value.

15. A method of designing an objective lens, comprising:
forming a diffraction portion on at least one of an incident plane or an output plane of the objective lens, the diffraction portion including a first diffraction region that is circular in shape and is provided on an innermost circumferential portion, a second diffraction region that is annular in shape and is provided outside the first diffraction region, and a third diffraction region that is annular in shape and is provided outside the second diffraction region, wherein first laser beams corresponding to a first optical disc having a first transmissive layer are condensed on a data recording portion of the first optical disc, second laser beams corresponding to a second optical disc having a second transmissive layer thicker than the first transmissive layer are condensed on a data recording portion of the second optical disc, and third laser beams corresponding to a third optical disc having a third transmissive layer thicker than the second transmissive layer are condensed on a data recording portion of the third optical disc;

identifying an in-plane efficiency distribution function that indicates a proportion of, among the first laser beams incident on the diffraction portion, the first laser beams condensed on the data recording portion of the first optical disc in association with a distance from an optical axis of the incident plane in a radial direction;

calculating, on the basis of the in-plane efficiency distribution function, an evaluation parameter having a correlation with a symbol error rate corresponding to the first optical disc; and adjusting a design of the objective lens so that the evaluation parameter has a value corresponding to the symbol error rate that is less than a predetermined value.

* * * * *